US011124226B2

(12) United States Patent
Nagashima et al.

(10) Patent No.: US 11,124,226 B2
(45) Date of Patent: Sep. 21, 2021

(54) ELECTRIC POWER STEERING APPARATUS

(71) Applicant: Mitsubishi Electric Corporation, Tokyo (JP)

(72) Inventors: Tomohiko Nagashima, Tokyo (JP); Akihiko Mori, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 234 days.

(21) Appl. No.: 16/319,032

(22) PCT Filed: Oct. 13, 2016

(86) PCT No.: PCT/JP2016/080296
§ 371 (c)(1),
(2) Date: Jan. 18, 2019

(87) PCT Pub. No.: WO2018/070004
PCT Pub. Date: Apr. 19, 2018

(65) Prior Publication Data
US 2019/0276071 A1 Sep. 12, 2019

(51) Int. Cl.
G01R 31/08 (2020.01)
B62D 5/04 (2006.01)
(Continued)

(52) U.S. Cl.
CPC .......... B62D 5/046 (2013.01); B62D 5/0403 (2013.01); B62D 5/0406 (2013.01); B62D 5/0484 (2013.01); H02K 11/33 (2016.01); H02P 25/16 (2013.01); H02P 25/22 (2013.01); H02P 27/06 (2013.01)

(58) Field of Classification Search
CPC ...... B62D 5/046; B62D 5/0484; H02K 11/33; H02P 25/22; H02P 27/06
See application file for complete search history.

(56) References Cited

U.S. PATENT DOCUMENTS

2005/0159866 A1    7/2005  Takeuchi et al.
2006/0197508 A1    9/2006  Matsumoto et al.
(Continued)

FOREIGN PATENT DOCUMENTS

CN    1829057 A    9/2006
JP    3839358 B2   11/2006
(Continued)

OTHER PUBLICATIONS

Communication dated Sep. 3, 2019 from Japanese Patent Office in counterpart JP Application No. 2018-544631.
(Continued)

*Primary Examiner* — Muhammad S Islam
(74) *Attorney, Agent, or Firm* — Sughrue Mion, PLLC; Richard C. Turner

(57) ABSTRACT

There are provided two sets of control units for driving an electric motor having two sets of independent windings; a power source is supplied through a single power-source connector; a conductive member connected with a terminal of the power-source connector branches into at least two portions in the vicinity of the power-source connector; two sets of power source relays, filters, and inverter circuits are arranged symmetrically with respect to the power-source connector.

19 Claims, 6 Drawing Sheets

(51) Int. Cl.
*H02K 11/33* (2016.01)
*H02P 25/22* (2006.01)
*H02P 27/06* (2006.01)
*H02P 25/16* (2006.01)

(56) References Cited

U.S. PATENT DOCUMENTS

| | | |
|---|---|---|
| 2010/0052449 A1 | 3/2010 | Hashimoto et al. |
| 2016/0036304 A1 | 2/2016 | Yamasaki et al. |
| 2017/0166248 A1* | 6/2017 | Asao .................... B62D 5/0493 |
| 2017/0217481 A1 | 8/2017 | Asao et al. |
| 2017/0237377 A1* | 8/2017 | Furukawa ............... H02P 29/00 318/564 |
| 2018/0178830 A1* | 6/2018 | Koseki ................ H02P 29/0241 |
| 2018/0208236 A1* | 7/2018 | Asao .................. H02P 29/0241 |

FOREIGN PATENT DOCUMENTS

| | | |
|---|---|---|
| JP | 2007-202263 A | 8/2007 |
| JP | 2009161156 A | 7/2009 |
| JP | 2010-63242 A | 3/2010 |
| JP | 2016-036246 A | 3/2016 |
| WO | 2016/063367 A1 | 4/2016 |

OTHER PUBLICATIONS

Communication dated Oct. 1, 2019 from European Patent Office in counterpart EP Application No. 16918879.4.

International Search Report of PCT/JP2016/080296 dated Nov. 29, 2016 [PCT/ISA/210].

Communication dated Dec. 1, 2020, from the China National Intellectual Property Administration in Application No. 201680089931.0.

* cited by examiner

ELECTRIC POWER STEERING APPARATUS

CROSS REFERENCE TO RELATED APPLICATIONS

This application is a National Stage of International Application No. PCT/JP2016/080296, filed Oct. 13, 2016, the contents of which are incorporated herein by reference in its entirety.

TECHNICAL FIELD

The present invention relates to an electric power steering apparatus in which each of an electric motor and a control unit for controlling the electric motor has redundancy and particularly to an electric power steering apparatus in which the redundancy is provided in the vicinity of a power source line for the control unit.

BACKGROUND ART

To date, in electric power steering apparatuses in each of which an electric motor produces assist torque for assisting steering torque produced by a vehicle driver, there exists an electric power steering apparatus in which there is provided an electric motor having two sets of armature windings that are formed substantially in the same manner and in which an inverter circuit that can separately drive the two sets of armature windings is provided in a control unit. At a normal time, the conventional electric power steering apparatus configured in such a manner as described above makes two sets of inverter circuits collaborate with each other so as to control the electric motor; however, in the case where an abnormality occurs in one of the two sets of inverter circuits, only the other normal inverter circuit continues driving of the electric motor.

To date, there has been disclosed an electric power steering apparatus in which the control-unit constituent elements, other than the inverter circuit, are made to be a double system so that the redundancy is raised and hence the countermeasure for a failure is further enriched (for example, refer to Patent Document 1). In the conventional electric power steering apparatus disclosed in Patent Document 1, not only two sets of armature windings of an electric motor are provided but also two sets of control units, each of which has a +B power source to be connected with the positive side of a vehicle battery, an input circuit, a CPU, an output circuit, and the like, are provided; in the case where an abnormality occurs in one of the two sets of control units, the other normal one thereof can continue driving of the electric motor.

PRIOR ART REFERENCE

Patent Document

[Patent Document 1] Japanese Patent Publication No. 3839358

DISCLOSURE OF THE INVENTION

Problems to be Solved by the Invention

In the conventional electric power steering apparatus disclosed in Patent Document 1, the +B power source, the input circuit, the CPU (central processing units), and the output circuit are provided in each of the two sets of control units; in the case where an abnormality occurs in one of the two sets of control units, the other normal one thereof can continue driving of the electric motor. However, in terms of the capability of being mounted in a vehicle and the cost, it is often disadvantageous to provide the two sets of control units so as to secure the redundancy; accordingly, it is required to secure the redundancy while taking both the cost-performance and the safety into consideration. In particular, as the number of connectors increases, not only the number of harness that engage with the connectors increases but also the area necessary for electrical connection from the connector terminal to the circuit network becomes double in comparison with the case where only one set of control unit is provided. Moreover, because the inverter circuit performs switching of a large current, improvement is required in taking countermeasures for noise emitted from the control unit.

The present invention has been implemented in order to solve the foregoing problem in the conventional electric power steering apparatus; the objective thereof is to provide an electric power steering apparatus that can simplify the circuitry in the vicinity of a connector and can suppress noise from being emitted, while having redundancy.

Means for Solving the Problems

An electric power steering apparatus according to the present invention includes an electric motor that produces assist torque, based on steering torque produced by a driver of a vehicle, a controller that controls the electric motor, and a power-source connector that is connected with a battery mounted in the vehicle and supplies respective power sources to the controller and the electric motor; the electric power steering apparatus is characterized in that the electric motor is provided with two sets of armature windings including a first armature winding and a second armature winding that are formed in substantially the same manner, in that the controller is formed of two sets of controllers that are formed in substantially the same manner and that include a first controller formed in such a way as to be capable of independently controlling the first armature winding and a second controller formed in such a way as to be capable of independently controlling the second armature winding, in that each of the first controller and the second controller has a power source relay formed in such a way as to be capable of turning on/off a power source,
    a filter connected with the power source relay,
    an input circuit to which information from a sensor is inputted,
    a driving circuit that generates a driving signal for driving the electric motor,
    an inverter circuit that is controlled by the driving signal, and
    a control circuit provided with a CPU that outputs to the driving circuit a command signal for controlling the electric motor based on the information inputted to the input circuit, in that the power-source connector is formed of a single connector, in that out of terminals of the power-source connector, a power source system to be connected at least with the positive-polarity side of the battery branches into two lines in the immediate vicinity of the terminals, in that the power source relay, the filter, and the inverter circuit in the first controller are sequentially connected with one of the branch lines, with the power source relay situated at the upstream side of the power source system, in that the power source relay, the filter, and the inverter circuit in the second controller are sequentially connected with the other one of the branch lines, with the power source relay situated at the upstream side of the power source system, and in that the power source relay and the filter in the first controller and the power source relay and the filter in the second controller are provided with substantially the same configuration and are arranged substantially symmetrically with respect to the terminals of the power-source connector.

Advantage of the Invention

In the present invention, when an abnormality occurs, only the power source for the system where the abnormality has occurred is cut off, so that the normal side is not affected and the normal side can continue control; thus, it is made possible to perform steering operation in a manner substantially the same as that at a time when no abnormality occurs.

BEST MODE FOR CARRYING OUT THE INVENTION

Embodiment 1

Figure 1:
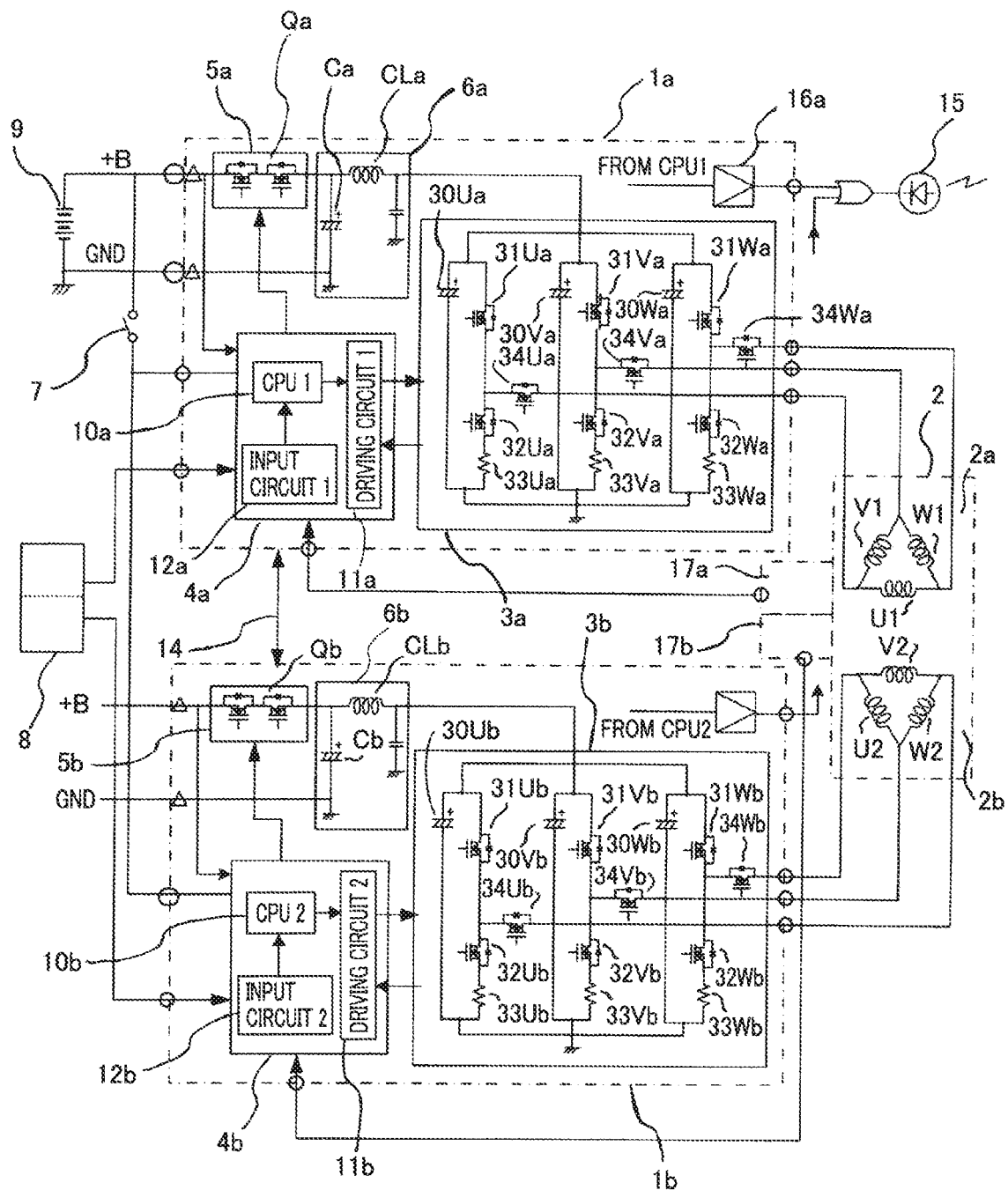
FIG. 1 is an overall circuit diagram of an electric power steering apparatus according to Embodiment 1 of the present invention.

Hereinafter, an electric power steering apparatus according to Embodiment 1 of the present invention will be explained with reference to the drawings. FIG. 1 is an overall circuit diagram of an electric power steering apparatus according to Embodiment 1 of the present invention. In FIG. 1, an electric motor 2 that produces assist torque for assisting steering torque produced by a vehicle driver has two sets of armature windings including a three-phase first armature winding 2a and a three-phase second armature winding 2b. The first armature winding 2a and the second armature winding 2b are configured substantially in the same manner; however, they are arranged in such a way as to be shifted by 120° electric angle from each other.

Two sets of control units as two sets of controllers, including a first control unit as a first controller 1a and a second control unit as a second controller 1b are each configured with the same constituent members; thus, they are configured substantially in the same manner. The first control unit 1a can independently supply electric power to the first armature winding 2a; the second control unit 1b can independently supply electric power to the second armature winding 2b. The marks "o" in FIG. 1 denote respective connection terminals in the first control unit 1a and the second control unit 1b.

At first, the first control unit 1a out of the two sets of control units will be explained. The first control unit 1a is provided with a first control circuit unit as a first control circuit 4a equipped with a first CPU 10a, a first inverter circuit 3a that supplies electric current to the first armature winding 2a of the electric motor 2, a first power-source relay 5a, and a first filter 6a. A pair of respective power-source terminals of the first control unit 1a are connected with a +B power source, connected with the positive-polarity terminal of a battery 9 mounted in a vehicle, and a ground terminal GND, which is the negative-polarity terminal of the battery 9. In the first control unit 1a, the first control circuit unit 4a is supplied with a power source through an ignition switch 7; moreover, information pieces, for example, from a torque sensor that is mounted in the vicinity of the handwheel of the vehicle and detects steering torque, a speed sensor that detects the traveling speed of the vehicle, and the like are inputted from sensors 8 to the first control circuit unit 4a.

The information pieces from the sensors 8 are transferred to the first CPU 10a by way of a first input circuit 12a provided in the first control circuit unit 4a. From those transferred information pieces, the first CPU 10a calculates a current value, which is a control amount for rotating the electric motor 2, and then outputs an output signal corresponding to the calculation value. The output signal from the first CPU 10a is transferred to a first driving circuit 11a forming a first output circuit and to the first inverter circuit 3a. The first driving circuit 11a receives a first command signal, which is the output signal from the first CPU 10a, and then outputs a first driving signal for driving after-mentioned switching devices in the first inverter circuit 3a. Because only a small current flows in the first driving circuit 11a, the first driving circuit 11a is mounted in the first control circuit unit 4a, in Embodiment 1; however, the first driving circuit 11a can be disposed also in the first inverter circuit 3a.

The first inverter circuit 3a is formed of a three-phase bridge circuit and is provided with a U-phase arm including a U-phase upper arm switching device 31Ua and a U-phase lower arm switching device 32Ua that are connected in series with each other, a V-phase arm including a V-phase upper arm switching device 31Va and a V-phase lower arm switching device 32Va that are connected in series with each other, and a W-phase arm including a W-phase upper arm switching device 31Wa and a W-phase lower arm switching device 32Wa that are connected in series with each other.

The series connection portion between the U-phase upper arm switching device 31Ua and the U-phase lower arm switching device 32Ua is connected with a U-phase winding U1 of the first armature winding 2a by way of a U-phase motor relaying switching device 34Ua. The series connection portion between the V-phase upper arm switching device 31Va and the V-phase lower arm switching device 32Va is connected with a V-phase winding V1 of the first armature winding 2a by way of a V-phase motor relaying switching device 34Va. The series connection portion between the W-phase upper arm switching device 31Wa and the W-phase lower arm switching device 32Wa is connected with a W-phase winding W1 of the first armature winding 2a by way of a W-phase motor relaying switching device 34Wa.

A U-phase shunt resistor 33Ua for detecting a U-phase current is connected in series with the U-phase lower arm switching device 32Ua; a V-phase shunt resistor 33Va for detecting a V-phase current is connected in series with the V-phase lower arm switching device 32Va; a W-phase shunt resistor 33Wa for detecting a W-phase current is connected in series with the W-phase lower arm switching device 32Wa.

A U-phase noise suppression capacitor 30Ua is connected in parallel with the U-phase arm including the U-phase upper arm switching device 31Ua and the U-phase lower arm switching device 32Ua. A V-phase noise suppression capacitor 30Va is connected in parallel with the V-phase arm including the V-phase upper arm switching device 31Va and the V-phase lower arm switching device 32Va. A W-phase noise suppression capacitor 30Wa is connected in parallel with the W-phase arm including the W-phase upper arm switching device 31Wa and the W-phase lower arm switching device 32Wa.

Respective potential differences across the U-phase shunt resistor 33Ua, the V-phase shunt resistor 33Va, and W-phase shunt resistor 33Wa and respective voltages at the winding terminals of the first armature winding 2a are transferred to the first control circuit unit 4a and are inputted to the first CPU 10a. The first CPU 10a calculates the difference between a current command value, calculated by itself based on steering torque produced by the driver and the like, and a current detection value, calculated based on the respective potential differences across the shunt resistors 33Ua, 33Va, and 33Wa, and then provides a first driving command for making the difference zero to the first driving circuit 11a.

Based on the first driving command from the first CPU 10a, the first driving circuit 11a provides driving signals to the respective gate electrodes of the U-phase upper arm switching device 31Ua and the U-phase lower arm switching device 32Ua, the V-phase upper arm switching device 31Va and the V-phase lower arm switching device 32Va, and the W-phase upper arm switching device 31Wa and the W-phase lower arm switching device 32Wa in the first inverter circuit 3a so as to perform PWM (Pulse Width Modulation) control of the switching devices.

As described above, the first control unit 1a performs feedback control in such a way that the difference between the current command value and the current detection value becomes zero, so that a desired motor current is supplied to the first armature winding 2a and hence assist torque for assisting steering torque produced by the driver is produced in the electric motor 2.

Moreover, the first control unit 1a is provided with the first power-source relay 5a that performs on/off operation of power supply from the +B power source of the battery 9 to the first inverter circuit 3a. The first power-source relay 5a is formed of a power-source relaying switching devices Qa. When a driving signal from the first control circuit unit 4a performs on/off operation of the power-source relaying switching devices Qa, the first power-source relay 5a can perform on/off operation of a current to be supplied to the first armature winding 2a of the electric motor 2.

By being on/off-driven by driving signals from the first control circuit unit 4a, the U-phase motor relaying switching device 34Ua, the V-phase motor relaying switching device 34Va, and the W-phase motor relaying switching device 34Wa provided in the first inverter circuit 3a can separately perform on/off operation of currents to be supplied from the first inverter circuit 3a to the U-phase winding U1, the V-phase winding V1, and the W-phase winding W1, respectively, of the first armature winding 2a.

The first CPU 10a has an abnormality detection function of detecting an abnormality in the first driving circuit 11a, the first inverter circuit 3a, the first armature winding 2a or the like, in addition to performing calculation of a current value, which is a control amount for rotating the foregoing electric motor, based on inputted various kinds of information pieces, such as a steering torque detection value and a vehicle speed, from the sensors 8; when an abnormality in these units is detected, it is made possible to turn off the upper-arm switching device, the lower-arm switching device, and the motor relaying switching device of the phase in which the abnormality is detected, so that for example, only the current supply to a predetermined phase is cut off in accordance with the abnormality. Alternatively, it is also made possible that in the case where the foregoing abnormality is detected, the first power-source relay 5a is turned off in order to cut off the power source itself to be supplied to the first control unit 1a.

As described above, the first inverter circuit 3a is PWM-driven by a driving signal that is provided from the first driving circuit 11a, based on the first driving command from the first CPU 10a; however, due to turn-on/off of the respective switching devices in the first inverter circuit 3a through the PWM driving, switching noise occurs. Accordingly, in order to suppress the switching noise from being emitted, the first filter circuit 6a including a filter capacitor Ca and a filter coil CLa is disposed at the input side of the first inverter circuit 3a.

Each of the marks "Δ" of the +B power source to be supplied to the first power-source relay 5a and the first filter 6a and the ground terminal GND denotes a portion extended from the corresponding connection terminal indicated by the mark "o"; the details thereof will be described later.

Next, the second control unit 1b will be explained. The second control unit 1b is provided with a second control circuit unit as a second control circuit 4b equipped with a second CPU 10b, a second inverter circuit 3b that supplies an electric current to the second armature winding 2b of the electric motor 2, a second power-source relay 5b, and a second filter 6b. The second control unit 1b is connected with the +B power source, which is the positive-polarity terminal of the battery 9 mounted in the vehicle, and with the ground terminal GND, which is the negative-polarity terminal of the battery 9. In the second control unit 1b, the second control circuit unit 4b is connected with a power source through an ignition switch 7; moreover, information pieces, for example, from a torque sensor that is mounted in the vicinity of the handwheel of the vehicle and detects steering torque, a speed sensor that detects the traveling speed of the vehicle, and the like are inputted from sensors 8 to the second control circuit unit 4b.

The information pieces from the sensors 8 are transferred to the second CPU 10b by way of a second input circuit 12b provided in the second control circuit unit 4b. From those transferred information pieces, the second CPU 10b calculates a current value, which is a control amount for rotating the electric motor 2, and then outputs an output signal corresponding to the calculation value. The output signal from the second CPU 10b is transferred to a second driving circuit 11b forming a second output circuit and to the second inverter circuit 3b. The second driving circuit 11b receives a second command signal, which is the output signal from the second CPU 10b, and then outputs a second driving signal for driving after-mentioned switching devices in the second inverter circuit 3b. Because only a small current flows in the second driving circuit 11b, the second driving circuit 11b is mounted in the second control circuit unit 4b, in Embodiment 1; however, the second driving circuit 11b can be disposed also in the second inverter circuit 3b.

The second inverter circuit 3b is formed of a three-phase bridge circuit and is provided with a U-phase arm including a U-phase upper arm switching device 31Ub and a U-phase lower arm switching device 32Ub that are connected in series with each other, a V-phase arm including a V-phase upper arm switching device 31Vb and a V-phase lower arm switching device 32Vb that are connected in series with each other, and a W-phase arm including a W-phase upper arm switching device 31Wb and a W-phase lower arm switching device 32Wb that are connected in series with each other.

The series connection portion between the U-phase upper arm switching device 31Ub and the U-phase lower arm switching device 32Ub is connected with a U-phase winding U2 of the second armature winding 2b by way of a U-phase motor relaying switching device 34Ub. The series connection portion between the V-phase upper arm switching device 31Vb and the V-phase lower arm switching device 32Vb is connected with a V-phase winding V2 of the second armature winding 2b by way of a V-phase motor relaying switching device 34Vb. The series connection portion between the W-phase upper arm switching device 31Wb and the W-phase lower arm switching device 32Wb is connected with a W-phase winding W2 of the second armature winding 2b by way of a W-phase motor relaying switching device 34Wb.

A U-phase shunt resistor 33Ub for detecting a U-phase current is connected in series with the U-phase lower arm switching device 32Ub; a V-phase shunt resistor 33Vb for detecting a V-phase current is connected in series with the V-phase lower arm switching device 32Vb; a W-phase shunt resistor 33Wb for detecting a W-phase current is connected in series with the W-phase lower arm switching device 32Wb.

In the second inverter circuit 3b, a U-phase noise suppression capacitor 30Ub is connected in parallel with the U-phase arm including the U-phase upper arm switching device 31Ub and the U-phase lower arm switching device 32Ub. A V-phase noise suppression capacitor 30Vb is connected in parallel with the V-phase arm including the V-phase upper arm switching device 31Vb and the V-phase lower arm switching device 32Vb. A W-phase noise suppression capacitor 30Wb is connected in parallel with the W-phase arm including the W-phase upper arm switching device 31Wb and the W-phase lower arm switching device 32Wb.

Respective potential differences across the U-phase shunt resistor 33Ub, the V-phase shunt resistor 33Vb, and W-phase shunt resistor 33Wb and respective voltages at the winding terminals of the second armature winding 2b are transferred to the second control circuit unit 4b and are inputted to the second CPU 10b. The second CPU 10b calculates the difference between a current command value, calculated by itself based on steering torque produced by the driver and the like, and a current detection value, calculated based on the respective potential differences across the shunt resistors 33Ub, 33Vb, and 33Wb, and then provides a second driving command for making the difference zero to the second driving circuit 11b.

Based on the second driving command from the second CPU 10b, the second driving circuit 11b provides driving signals to the respective gate electrodes of the U-phase upper arm switching device 31Ub and the U-phase lower arm switching device 32Ub, the V-phase upper arm switching device 31Vb and the V-phase lower arm switching device 32Vb, and the W-phase upper arm switching device 31Wb and the W-phase lower arm switching device 32Wb in the second inverter circuit 3b so as to perform PWM control of the switching devices.

As described above, as is the case with the foregoing first control unit 1a, the second control unit 1b performs feedback control in such a way that the difference between the current command value and the current detection value becomes zero, so that a desired motor current is supplied to the second armature winding 2b and hence assist torque for assisting steering torque produced by the driver is produced in the electric motor 2.

Moreover, the second control unit 1b is provided with the second power-source relay 5b that performs on/off operation of power supply from the +B power source of the battery 9 to the second inverter circuit 3b. The second power-source relay 5b is formed of a power-source relaying switching devices Qb. When a driving signal from the second control circuit unit 4b performs on/off operation of the power-source relaying switching devices Qb, the second power-source relay 5b can perform on/off operation of a current to be supplied to the second armature winding 2b the electric motor 2.

By being on/off-driven by driving signals from the second control circuit unit 4b, the U-phase motor relaying switching device 34Ub, the V-phase motor relaying switching device 34Vb, and the W-phase motor relaying switching device 34Wb provided in the second inverter circuit 3b can separately perform on/off operation of currents to be supplied from the second inverter circuit 3b to the U-phase winding U2, the V-phase winding V2, and the W-phase winding W2, respectively, of the second armature winding 2b.

The second CPU 10b has an abnormality detection function of detecting an abnormality in the second driving circuit 11b, the second inverter circuit 3b, the second armature winding 2b or the like, in addition to performing calculation of a current value, which is a control amount for rotating the foregoing electric motor, based on inputted various kinds of information pieces, such as a steering torque detection value and a vehicle speed, from the sensors 8; when an abnormality in these units is detected, it is made possible to turn off the upper-arm switching device, the lower-arm switching device, and the motor relaying switching device of the phase in which the abnormality is detected, so that for example, only the current supply to a predetermined phase is cut off in accordance with the abnormality. Alternatively, it is also made possible that in the case where the foregoing abnormality is detected, the second power-source relay 5b is turned off in order to cut off the power source itself to be supplied to the second control unit 1b.

As described above, the second inverter circuit 3b is PWM-driven by a driving signal that is provided from the second driving circuit 11b, based on the second driving command from the second CPU 10b. Due to turn-on/off of the respective switching devices in the second inverter circuit 3b through the PWM driving, switching noise occurs. Accordingly, in order to suppress the switching noise from being emitted, the second filter 6b including a filter capacitor Cb and a filter coil CLb is disposed at the input side of the second inverter circuit 3b.

Each of the marks "Δ" of the +B power source to be supplied to the second power-source relay 5b and the second filter 6b and the ground terminal GND denotes a portion extended from the corresponding connection terminal indicated by the mark "o"; the details thereof will be described later.

The electric motor 2 is formed of a brushless electric motor in which as described above, the two sets of armature windings including the three-phase first armature winding 2a and the three-phase second armature winding 2b are each delta-connected. Because being a brushless electric motor, the motor 2 is equipped with a first rotation sensor 17a and a second rotation sensor 17b for detecting the rotation position of the rotor. As described above, in order to secure the redundancy, two sets of rotation sensors, which are substantially in the same configuration, are provided. The information on the rotation position of the rotor, detected by the first rotation sensor 17a, is transferred to the first control circuit unit 4a and then is inputted to the first input circuit 12a. The information on the rotation position of the rotor, detected by the second rotation sensor 17b, is transferred to the second control circuit unit 4b and then is inputted to the second input circuit 12b.

The electric motor 2 may be not a three-phase delta-connection brushless motor but a three-phase star connection brushless motor or a double-pole two-pair brush motor. As is the case with a conventional apparatus, the winding specification of the armature winding may be either distributed winding or concentrated winding. Furthermore, the electric motor 2 may be a so-called tandem electric motor having two stators. In this case, it may be allowed that only one set of armature winding is provided or that two sets of armature windings are provided and driving is performed by collaboration of these armature windings; what matters is that any configuration is allowed as long as a desired motor rotation speed is achieved and desired torque can be outputted.

A notification means 15 is configured, for example, in such a way as to be able to light a lamp; in the case where the first CPU 10a detects the foregoing abnormality, action such as lighting a lamp is taken based on an alarm signal to be outputted from the first CPU 10a by way of the first output circuit 16a, so that the abnormality is notified to the driver; alternatively, in the case where the second CPU 10b detects the foregoing abnormality, an action such as lighting a lamp is taken based on an alarm signal to be outputted from the second CPU 10b by way of the second output circuit 16b, so that the abnormality is notified to the driver.

As described above, each of the first control unit 1a and the second control unit 1b independently utilizes input information and the calculation value for a control amount and is capable of independently driving the electric motor 2. The first control unit 1a and the second control unit 1b are connected with each other through a communication line 14 so that data and information of the opposite party can be transmitted and received. The communication line 14 connects the first CPU 10a with the second CPU 10b, so that the first CPU 10a can comprehend the condition of the second CPU 10b, and vice versa. For example, when the first CPU 10a detects the foregoing abnormality and hence turns off the foregoing predetermined switching device, the contents of abnormality detection, abnormal components, the contents of motor driving, and the like can be transferred to the second CPU 10b. When an abnormality occurs in any one of the CPUs themselves, the periodic predetermined-format communication signal can be neither transmitted nor received; thus, it is also made possible that one of the CPUs detects the fact that an abnormality has occurred in the other one of the CPUs.

Figure 2:
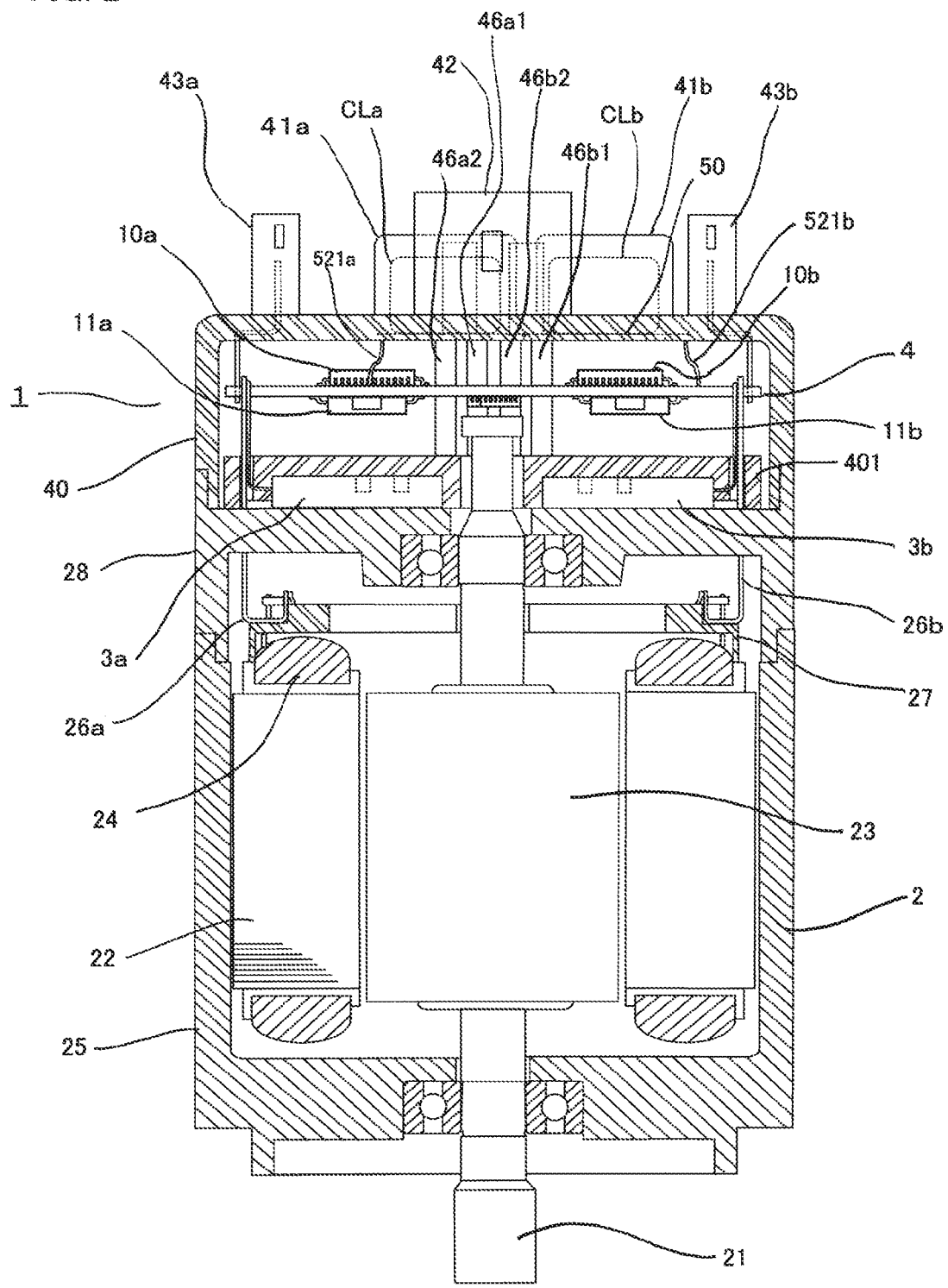
FIG. 2 is a cross-sectional view of the electric power steering apparatus according to Embodiment 1 of the present invention.

Next, the structure of the electric power steering apparatus according to Embodiment 1 of the present invention will be explained. FIG. 2 is a cross-sectional view of the electric power steering apparatus according to Embodiment 1 of the present invention. In FIG. 2, the lower side of the drawing is the electric motor 2; the control unit 1 including the foregoing first and second control units is disposed at the upper side, with respect to the electric motor 2, of the drawing. The electric motor 2 and the control unit 1 are integrated with each other in the axel direction in such a way as to be arranged coaxially on an electric-motor output axle 21, through the intermediary of an after-mentioned frame 28.

The electric motor 2 has an electric motor case 25 formed in the shape of a substantially cylindrical tube. With regard to the electric motor case 25, the lower most portion thereof in the drawing is covered with a wall portion that extends in a direction perpendicular to the axle direction, and the uppermost portion thereof in the drawing is opened. The foregoing wall portion of the electric motor case 25 is coupled with a case (unillustrated) of a deceleration mechanism unit. The electric-motor output axle 21 is pivotably supported by a bearing member provided in the wall portion of the electric motor case 25, penetrates the wall portion of the electric motor case 25, and is coupled with an unillustrated input axle of the deceleration mechanism unit.

In the electric motor case 25, there are provided a rotor 23 having two or more pairs of magnetic-field poles formed of permanent magnets and a stator 22 whose inner circumferential surface faces the outer circumferential surface of the rotor 23 through a gap. The rotor 23 is fixed on the outer circumferential surface of the electric-motor output axle 21. An armature winding 24 is inserted into a slot provided in the stator 22 and includes the foregoing three-phase first armature winding 2a (unillustrated) and three-phase second armature winding 2b (unillustrated).

A ring-shaped connection ring 27 fixed to the stator 22 is disposed in the immediate vicinity of one of the axle-direction end portions of the armature winding 24. As described above, each of the first armature winding and the second armature winding included in the armature winding 24 has the U-phase winding, the V-phase winding, and the W-phase winding. The U-phase winding, the V-phase winding, and the W-phase winding of the first armature winding in the armature winding 24 are delta-connected with one another; each of three first winding end portions 26a connected with the respective phase windings is pulled out from the connection ring 27 in the axle direction of the electric motor 2 and extends into the control unit 1. Similarly, the U-phase winding, the V-phase winding, and the W-phase winding of the second armature winding in the armature winding 24 are delta-connected with one another through the intermediary of the connection ring 27; each of three second winding end portions 26b connected with the respective phase windings is pulled out from the connection ring 27 in the axle direction of the electric motor 2 and extends into the control unit 2.

The frame 28 made of metal is coupled with the opening portion of the electric motor case 25 so as to cover the opening portion of the electric motor case 25; concurrently, the frame 28 pivotably supports the electric-motor output axle 21 through the intermediary of a bearing member. The electric-motor output axle 21 penetrates the frame 28 in the axle direction and extends into a housing 40 that covers the control unit 1. The frame 28 has a through-hole (unillustrated), through which the first winding end portion 26a passes, and a through-hole (unillustrated), through which the second winding end portion 26b passes, arranged at respective positions that face each other with respect to the center axis and are in the vicinity of the peripheral portion; the first winding portion 26a and the second winding end portion 26b are made to penetrate these respective through-holes.

The housing 40 formed of resin covers the control unit 1 and incorporates the control board 4 forming the first control circuit unit 4a and the second control circuit unit 4b represented in FIG. 1, the first inverter circuit 3a, the second inverter circuit 3b, and the like. At the upper portion, in the drawing, of the housing 40, i.e., at the axle-direction endface thereof, there are provided a first filter room 41a, which is convex and protrudes in the axle direction, and a second filter room 41b, which is convex and protrudes in the axle direction. The first filter room 41a incorporates the power-source relaying switching device Qa (unillustrated) forming the first power-source relay 5a, and the filter capacitor Ca (unillustrated) and the filter coil CLa forming the first filter 6a. The second filter room 41b incorporates the power-source relaying switching device Qb (unillustrated) forming the second power-source relay 5b, and the filter capacitor Cb (unillustrated) and the filter coil CLb forming the second filter 6b.

Figure 4:
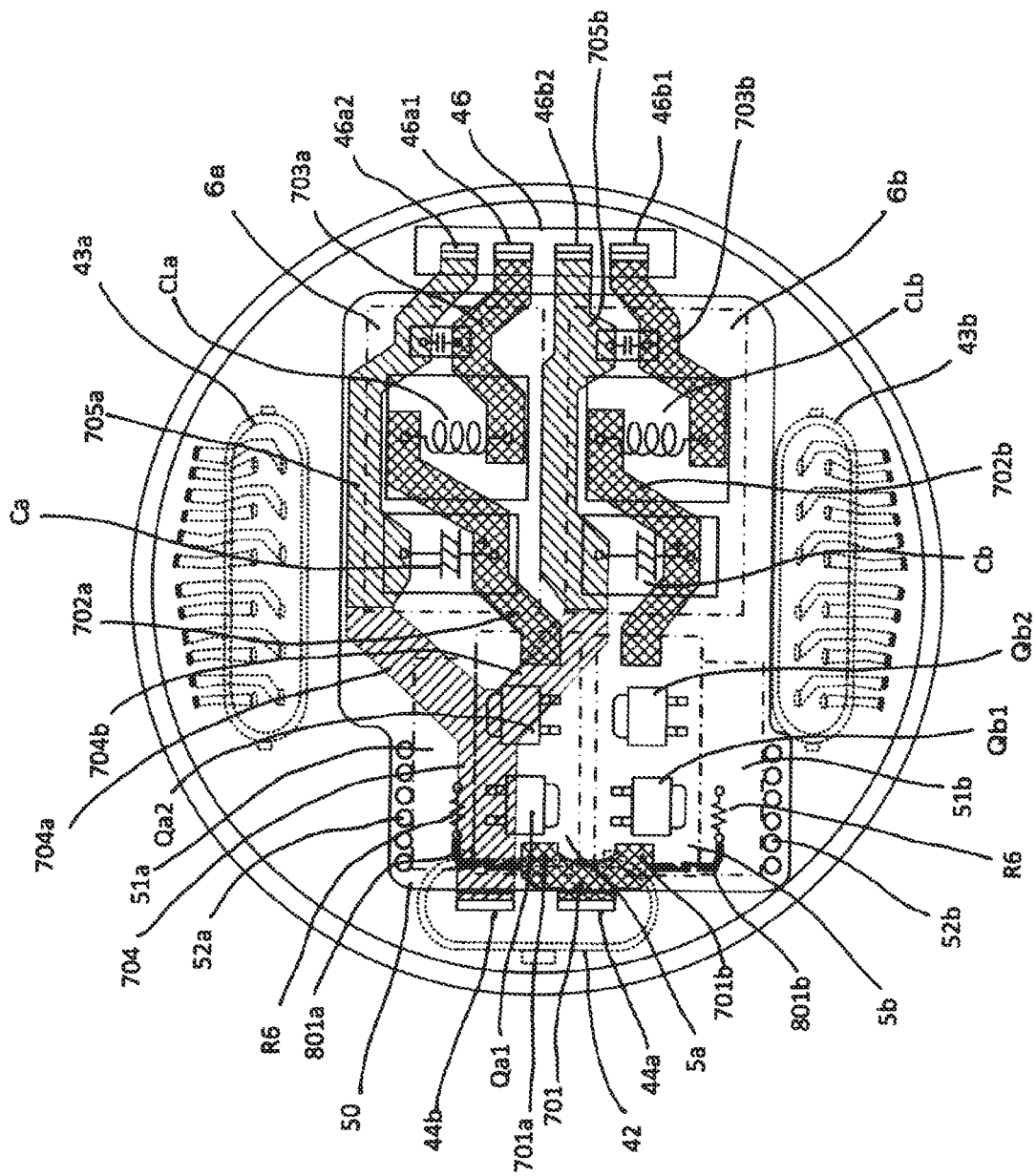
FIG. 4 is a plan view representing the detailed configuration of part of the electric power steering apparatus according to Embodiment 1 of the present invention.

As illustrated in after-mentioned FIG. 4, a power-source connector 42 is disposed at a position that is in the vicinity of the first filter room 41a and the second filter room 41b on the axle-direction endface of the housing 40 and is the peripheral portion of the housing 40; furthermore, a first signal connector 43a and a second signal connector 43b leading to the sensors 8 are arranged at respective positions that are apart from the power-source connector 42. The housing 40, the first filter room 41a, the second filter room 41b, the power-source connector 42, the first signal connector 43a, and the second signal connector 43b are each formed of resin; all or part of these members are integrated with one another.

The control board 4 is equipped with circuit components included in the first control circuit unit 4a and the second control circuit unit 4b. In other words, the first CPU 10a and the second CPU 10b are mounted on the upper side, in the drawing, of the control board 4, i.e., on the anti-motor-side surface thereof; the first driving circuit 11a, the second driving circuit 11b, and the like are mounted on the lower side, in the drawing, of the control board 4, i.e., on the motor-side surface thereof.

The first inverter circuit 3a is formed as a first power module in which there are integrally molded, with resin, the U-phase upper arm switching device 31Ua, the V-phase upper arm switching device 31Va, and the W-phase upper arm switching device 31Wa, the U-phase lower arm switching device 32Ua, the V-phase lower arm switching device 32Va, and the W-phase lower arm switching device 32Wa, the U-phase motor relay switching device 34Ua, the V-phase motor relay switching device 34Va, and the W-phase motor relay switching device 34Wa, the U-phase noise suppression capacitor 30Ua, the V-phase noise suppression capacitor 30Va, and the W-phase noise suppression capacitor 30Wa, and the U-phase shunt resistor 33Ua, the V-phase shunt resistor 33Va, and the W-phase shunt resistor 33Wa.

The second inverter circuit 3b is formed as a second power module in which there are integrally molded, with resin, the U-phase upper arm switching device 31Ub, the V-phase upper arm switching device 31Vb, and the W-phase upper arm switching device 31Wb, the U-phase lower arm switching device 32Ub, the V-phase lower arm switching device 32Vb, and the W-phase lower arm switching device 32Wb, the U-phase motor relay switching device 34Ub, the V-phase motor relay switching device 34Vb, and the W-phase motor relay switching device 34Wb, the U-phase noise suppression capacitor 30Ub, the V-phase noise suppression capacitor 30Vb, and the W-phase noise suppression capacitor 30Wb, and the U-phase shunt resistor 33Ub, the V-phase shunt resistor 33Vb, and the W-phase shunt resistor 33Wb.

Each of the first inverter circuit 3a as the first power module and the second inverter circuit 3b as the second power module is mounted on an intermediate frame 401 made of resin; concurrently, because when driven, each of the first inverter circuit 3a and the second inverter circuit 3b causes heat generation, each of them is made to abut on the surface, at the control unit side, of the frame 28 so that the heat can be transferred to the metal frame 28. In other words, the frame 28 has a role also as a heat sink. The first winding end portions 26a is connected with the output terminal of the first inverter circuit 3a as the first power module. The second winding end portions 26b is connected with the output terminal of the second inverter circuit 3b as the second power module.

Figure 3:
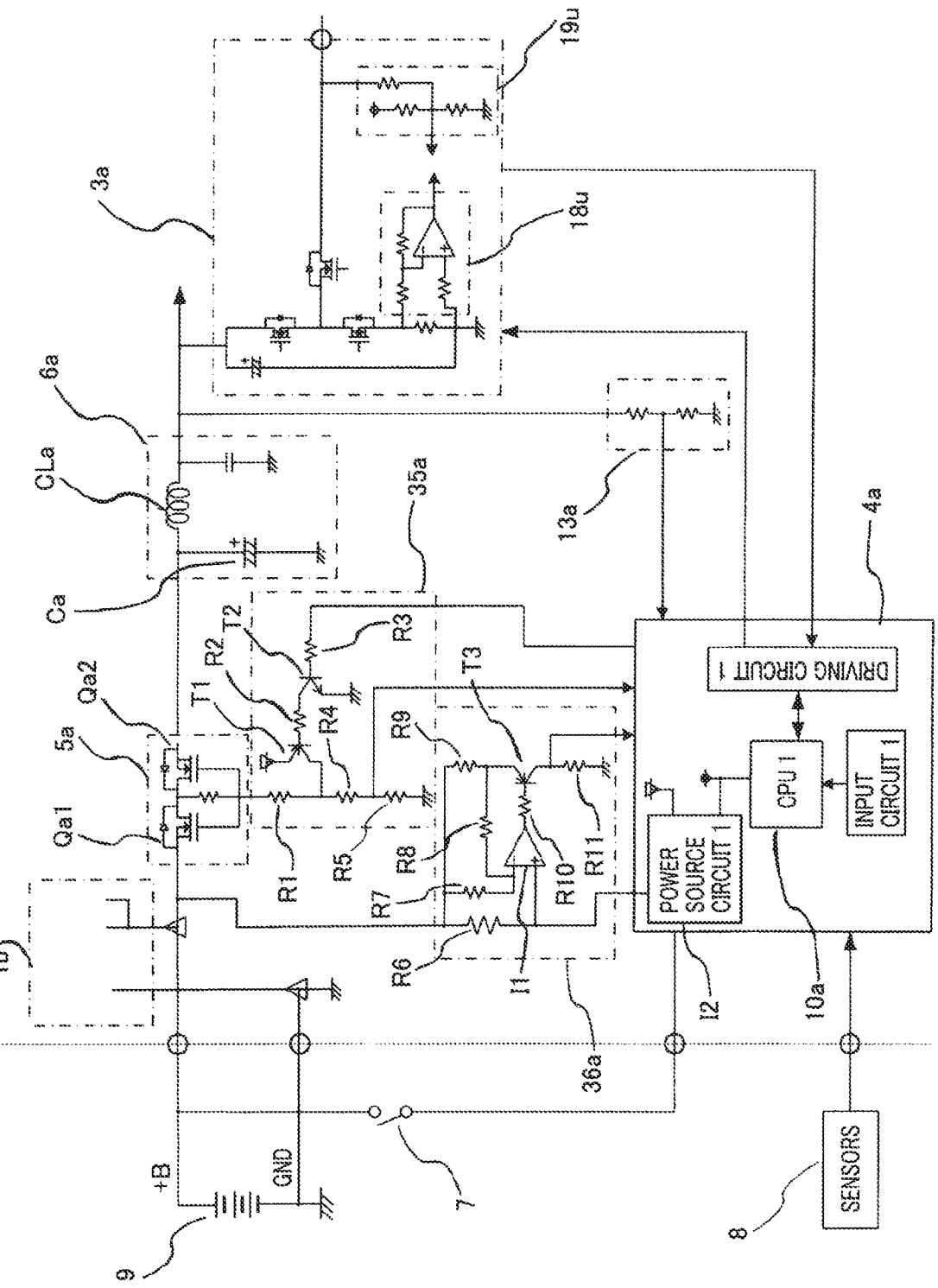
FIG. 3 is a detailed circuit diagram of part of the electric power steering apparatus according to Embodiment 1 of the present invention.

Next, the configurations of peripheral circuits such as the power source relay and the filter in the control unit will be explained in detail. In the following explanation, the first control unit 1a will be explained; however, the second control unit 1b is configured in the same manner. FIG. 3 is a detailed circuit diagram of part of the electric power steering apparatus according to Embodiment 1 of the present invention; FIG. 3 represents in detail the circuit configuration of part of the first control unit 1a represented in FIG. 1. In FIG. 3, the +B power source connected with the positive-polarity electrode of the battery 9 is connected with the electric power steering apparatus by way of a connection terminal indicated by the mark "o" in the drawing; the +B power source branches into the first control unit 1a and the second control unit 1b at a branch point indicated by the mark "Δ" in the drawing.

Furthermore, in the first control unit 1a, the +B power source branches into an after-mentioned first detection circuit 36a and the first power-source relay 5a at a second branch point following the branch point indicated by the mark "Δ". As represented in FIG. 3, the first power-source relay 5a includes power-source relaying switching devices Qa1 and Qa2 that are connected in series with each other and are connected in parallel with respective diodes whose directions are opposite to each other. The power-source relaying switching device Qa in the first power-source relay 5a represented in FIG. 1 is described as the one that includes the power-source relaying switching devices Qa1 and Qa2 represented in FIG. 3.

Because as described above, the power-source relaying switching devices Qa1 and Qa2 in the first power-source relay 5a are connected in series with each other and are connected in parallel with the respective diodes whose directions are opposite to each other, the direction in which a current flows is determined; thus, for example, even when the positive-polarity electrode and the negative-polarity electrode of the battery 9 are connected the other way around, no current flows. Moreover, as described above, in the case where any abnormality occurs, power supply can be cut off based on a command from the first CPU 10a.

In the electric power steering apparatus according to Embodiment 1 of the present invention, in order to drive the power-source relaying switching devices Qa1 and Qa2 in the first power-source relay 5a, a power-source relay driving circuit 35a formed of resistors R1, R2, and R3, and transistors T1 and T2 is provided. In the power-source relay driving circuit 35a, the emitter of the transistor T1 is connected with a power source, indicated by the mark "∇", in the first control unit 1a; the collector thereof is connected with the series connection point between the resistor R1 and a resistor R4.

One end of the resistor R1 is connected with the respective gate electrodes of the power-source relaying switching devices Qa1 and Qa2. The base of the transistor T1 is connected with the collector of the transistor T2 via the resistor R2. The emitter of the transistor T2 is connected with the ground level, and the base electrode is connected with the first control circuit unit 4a via the resistor R3. The voltage across a resistor R5 is inputted to the first control circuit unit 4a. The transistor T2 is on/off-controlled by a driving signal from the first control circuit unit 4a, based on a command from the first CPU 10a; the transistor T1 is on/off-controlled based on on/off of the transistor T2.

The power source ∇ with which the emitter of the transistor T1 is connected is a power source having an electric potential higher than the +B power source connected with the positive-polarity electrode of the battery 9; thus, it is made possible to turn on the power-source relaying switching devices Qa1 and Qa2. The resistors R4 and R5 are each a monitoring voltage dividing resistor and are configured in such a way that the first control circuit unit 4a can detect the respective ON states of the transistors T1 and T2.

The first filter 6a including the filter capacitor Ca, the filter coil CLa, and the like is connected with the downstream side of the first power-source relay 5a; the first inverter circuit 3a is connected with the downstream side of the first filter 6a. The voltage at a connection point as the intermediate point between the first filter 6a and the first inverter circuit 3a is detected by a second detection circuit 13a and is inputted to the first control circuit unit 4a; the first control circuit unit 4a monitors the voltage. In the case where even though the first power-source relay 5a is turned on, the second detection circuit 13a cannot detect a voltage corresponding to the output voltage of the battery 9, the first CPU 10a can determine that there exists probability that a short-to-ground failure might have occurred at the upstream side of the first inverter circuit 3a in the first control unit 1a, based on the voltage monitored by the resistors R4 and R5 and the voltage from the second detection circuit 13a.

A third detection circuit 18u detects a current flowing in the U-phase lower arm in the first inverter circuit 3a and then inputs the current to the first control circuit unit 4a; a fourth detection circuit 19u detects the terminal voltage of the U-phase winding U1 of the first armature winding 2a and then inputs the terminal voltage to the first control circuit unit 4a. Each of respective currents flowing in the V-phase lower arm and the W-phase lower arm in the first inverter circuit 3a is detected by a detection circuit similar to the third detection circuit 18u and is inputted to the first control circuit unit 4a. Each of the respective terminal voltages of the V-phase winding V1 and the W-phase winding W1 of the first armature winding 2a is detected by a detection circuit similar to the fourth detection circuit and is inputted to the first control circuit unit 4a. The first control circuit unit 4a monitors the inputted currents in the lower arms of the respective phases and the inputted voltages of the respective winding terminals of the first armature winding 2a of the electric motor 2 so as to detect a short-circuit failure or a short-to-ground failure in the switching devices in the first inverter circuit 3a and the first armature winding 2a of the electric motor 2, and the like; it is made possible that the first control circuit unit 4a cuts off the first power-source relay 5a depending on the contents of the failure.

It is desirable that the current detection circuits of the respective phases such as the foregoing power-source relay driving circuit 35a, the second detection circuit 13a, the third detection circuit 18u, and the like and the winding-terminal-voltage detection circuits such as the fourth detection circuit 19u and the like are provided in all of the respective two sets of the first control unit 1a and the second control unit 1b of the three phases.

Each of the voltages or the currents that are monitored by the foregoing detection circuits is transferred to the first CPU 10a in the first control circuit unit 4a. In accordance with a control command of its own, the first CPU 10a comprehends the contents of the monitored voltage or the monitored current so as to determine whether or not an abnormality exists. In other words, in the case where even though a predetermined current flows in the electric motor 2, the third detection circuit 18u cannot detect the voltage or a voltage other than the one corresponding to the predetermined current is generated, the first CPU 10a can determine that an abnormality exists. In the case where even though the electric motor 2 is driven, no voltage is generated or in the case where when the electric motor 2 is not driven, a voltage is generated, the first CPU 10a can determine that an abnormality exists, because the detection circuits, such as the fourth detection circuit 19u and the like, of the respective phases monitor the terminal voltages of the respective phases of the electric motor 2. In the case of these abnormalities, the first CPU 10a outputs a control command to the first driving circuit 11a so as to cut off the first power-source relay 5a. Furthermore, in the case of these abnormalities, the first CPU 10a can stop a power source circuit 12.

A power source for turning on the first power-source relay 5a in which a relatively small current flows and a control command circuit therefor are connected with another branch of the line of the +B power source of the battery 9. Accordingly, a failure may occur also in this circuit network; thus, in the case where the failure causes an excessive current to flow, the power source relay needs to be cut off. Accordingly, the first detection circuit 36a is provided. As represented in FIG. 3, the first detection circuit 36a includes resistors R6, R7, and R9, each one end of which is connected with the branch point V of the +B power source, a transistor T3 whose emitter is connected with the other end of the resistor R9 and whose collector is connected with the ground level via a resistor R11, a resistor R8 whose one end is connected with the other end of the resistor R9, and an amplifier I1, one of the input terminals of which is connected with the other ends of the resistors R7 and R8, the other one of the input terminals of which is connected with the other end of the resistor R6, and the output terminal of which is connected with the base of the transistor T3 via a resistor R10.

The basic operation of the first detection circuit 36a is to amplify a potential difference caused by an current flow in the resistor R6, by use of the amplifier I1; the first CPU 10a monitors whether or not the value obtained through the amplification by the first detection circuit 36a is within a predetermined range.

A first power source circuit 12 having a circuit (unillustrated) including a capacitor and a diode and a circuit (unillustrated) including a transistor is provided in the first control circuit unit 4a; the input terminal of the first power source circuit 12 is connected with the other one of the input terminals of the amplifier I1. The output terminal of the first power source circuit 12 is connected with the first CPU 10a.

As described above, the first CPU 10*a* monitors whether or not the value obtained through the amplification by the first detection circuit 36*a* is within a predetermined range; setting of the predetermined range is determined by a current value to be consumed by the first detection circuit 36*a*, the power source circuit 12, and the like. When the first detection circuit 36*a* detects the fact that an excessive current flows in the resistor R6, it is suggested that an abnormality has occurred in the first detection circuit 36*a*, the first power source circuit 12, or the like; therefore, in addition to outputting in such a way as to cut off the first power-source relay 5*a*, the first CPU 10*a*, for example, stops the first power source circuit 12 so as to prevent the excessive current.

The first power source circuit 12 generates a high voltage indicated by the mark "V" and a voltage that has a voltage lower than the battery voltage and is a power source for the circuits to be directly driven by the battery. For example, the first power source circuit 12 is formed of a charge pump circuit and has the circuit (unillustrated) including a capacitor and a diode and the circuit (unillustrated) including a transistor having a function as a constant voltage power source to be utilized in the first CPU 10*a*. Therefore, even when the ignition switch 7 is not turned on, the first CPU 10*a* can perform its function.

As described above, two or more circuit networks are formed in the vicinity of the power source relay; the two or more circuit networks are provided in each of the first control unit 1*a* and the second control unit 1*b*: thus, there are provided totally two sets of two or more circuit networks. When the redundancy is taken into consideration, it is required that after connection with the apparatus, the respective circuits are each formed of a double system and that when being abnormal, one of the double systems is cut off so that no effect is provided to the other one thereof. Therefore, at first, the power source relay is connected; then, the filter and the inverter circuit are connected. For example, in the case where a short-circuit failure occurs in the capacitor of the filter, the failure point is situated at the downstream side of the power source relay; thus, cutting off of the power source relay prevents any effect from being provided to the normal system. Each of the second driving circuit and the first detection circuit 36*a* is connected by a narrow strip conductor that can be cut off by an excessive current when as in the case of a short-to-ground failure, the excessive current flows in the second driving circuit or the first detection circuit 36*a*, so that it is also made possible to prevent a large current from flowing.

Next, the arrangement and the connection configuration of the first power-source relay 5*a*, the second power-source relay 5*b*, the first filter 6*a*, the second filter 6*b*, the power-source relay driving circuit 35*a*, and the first detection circuit 36*a* represented in FIGS. 1 and 3 will be explained.

FIG. 4 is a plan view representing the detailed configuration of part of the electric power steering apparatus according to Embodiment 1 of the present invention; FIG. 4 represents the part of the electric power steering apparatus as an internal configuration excluding the configuration of the top-surface portion of the housing 40 for the power-source connector 42, the first signal connector 43*a*, the second signal connector 43*b*, the first filter room 41*a*, the second filter room 41*b*, and the like.

In FIG. 4, an insulating member 50 formed of resin is embedded or mounted in the inner surface portion of the housing 40, as illustrated in FIG. 2; the insulating member 50 has a first surface, which is an anti-motor-side surface, and a second surface, which is a motor-side surface. The first surface and the second surface of the insulating member 50 are in a front-and-back relationship. A power-source terminal 44*a* in the power-source connector 42 is provided on the first surface of the insulating member 50 and is connected with the +B power source connected with the positive-polarity terminal of the battery 9. A power-source terminal 44*b* in the power-source connector 42 is provided on the second surface of the insulating member 50 and is connected with the ground terminal GND.

The first power-source relay 5*a* and the second power-source relay 5*b* are arranged in parallel with each other in the vertical direction of FIG. 4 and are fixed on the first surface of the insulating member 50. A pair of power-source relaying switching devices Qa1 and Qa2 in the first power-source relay 5*a* are arranged in parallel with each other in the horizontal direction of FIG. 4 and are arranged in such a way as to be oriented opposite to each other in the vertical direction. A pair of power-source relaying switching devices Qb1 and Qb2 in the second power-source relay 5*b* are arranged in parallel with each other in the horizontal direction of FIG. 4 and are arranged in such a way as to be oriented opposite to each other in the vertical direction. The first power-source relay 5*a* and the second power-source relay 5*ba* are configured in the same manner.

The first filter 6*a* and the second filter 6*b* are arranged at an after-mentioned terminal unit 46 side with respect to the first power-source relay 5*a* and the second power-source relay 5*b*. The first filter 6*a* and the second filter 6*b* are arranged in parallel with each other in the vertical direction of FIG. 4 and are fixed on the first surface of the insulating member 50. The filter capacitor Ca and the filter coil CLa of the first filter 6*a* are arranged in the horizontal direction of FIG. 4; similarly, the filter capacitor Cb and the filter coil CLb of the second filter 6*b* are arranged in the horizontal direction of FIG. 4. The respective positive-polarity terminals of the filter capacitor Ca and the filter capacitor Cb are arranged in such a way as to face the lower side of FIG. 4 The first filter 6*a* and the second filter 6*b* are configured in the same manner.

A conductive member 701, as a bus bar, connected with the power-source terminal 44*a* is disposed on the first surface of the insulating member 50 and symmetrically branches into a first portion 701*a* and a second portion 701*b* in the vicinity of the power-source terminal 44*a*. The first portion 701*a* that has branched is connected with the power-source relaying switching devices Qa1 and Qa2 of the first power-source relay 5*a* in the first control unit 1*a*. The second portion 701*b* that has branched is connected with the power-source relaying switching devices Qb1 and Qb2 of the second power-source relay 5*b* in the second portion 701*b*.

A conductive member 702*a*, as a bus bar, disposed on the first surface of the insulating member 50 is connected with the power-source relaying switching devices Qa1 and Qa2 of the first power-source relay 5*a* and is connected with the positive-polarity terminal of the filter capacitor Ca of the first filter 6*a* and with one end of the filter coil CLa. A conductive member 702*b*, as a bus bar, disposed on the first surface of the insulating member 50 is connected with the power-source relaying switching devices Qb1 and Qb2 of the second power-source relay 5*b* and is connected with the positive-polarity terminal of the filter capacitor Cb of the second filter 6*b* and with one end of the filter coil CLb.

The terminal unit 46 has a first positive-polarity terminal 46*a*1, a second positive-polarity terminal 46*b*1, a first negative-polarity terminal 46*a*2, and a second negative-polarity terminal 46*b*2; these terminals are provided on the first surface of the insulating member 50; from the upper position to the lower position of FIG. 4, the first negative-polarity terminal 46a2, the first positive-polarity terminal 46a1, the second negative-polarity terminal 46b2, and the second positive-polarity terminal 46b1 are sequentially arranged in that order. As illustrated in FIG. 2, these terminals each extend to the first power module including the first inverter circuit 3a and the second power module including the second inverter circuit 3b, through the control board 4; the first power module and the second power module are mounted in the intermediate frame 401.

The first positive-polarity terminal 46a1 is connected with the positive-polarity DC terminal of the first inverter circuit 3a; the first negative-polarity terminal 46a2 is connected with the negative-polarity DC terminal of the first inverter circuit 3a; the second positive-polarity terminal 46b1 is connected with the positive-polarity DC terminal of the second inverter circuit 3b; the second negative-polarity terminal 46b2 is connected with the negative-polarity DC terminal of the second inverter circuit 3b.

In FIG. 4, a conductive member 703a, as a bus bar, disposed on the first surface of the insulating member 50 is connected with the other end of the filter coil CLa in the first filter 6a and with the positive-polarity terminal 46a1 of the terminal unit 46. A conductive member 703b, as a bus bar, disposed on the first surface of the insulating member 50 is connected with the other end of the filter coil CLb in the second filter 6b and with the positive-polarity terminal 46b1 of the terminal unit 46.

A conductive member 704 connected with the power-source terminal 44b in the power-source connector 42 is disposed on the second surface of the insulating member 50 and branches into a first portion 704a and a second portion 704b. A conductive member 705a disposed on the first surface of the insulating member 50 is electrically connected with the first portion 704a of the conductive member 704 disposed on the second surface of the insulating member 50 and is connected with the negative-polarity terminal of the filter capacitor Ca in the first filter 6a and with the first negative-polarity terminal 46a2 of the terminal unit 46. A conductive member 705b disposed on the first surface of the insulating member 50 is electrically connected with the second portion 704b of the conductive member 704 disposed on the second surface of the insulating member 50 and is connected with the negative-polarity terminal of the filter capacitor Cb in the second filter 6b and with the second negative-polarity terminal 46a2 of the terminal unit 46.

Part of the second portion 704b of the conductive member 704 and part of the conductive member 702a overlap with each other in the vertical direction with respect to the paper plane of FIG. 4; however, because as described above, the conductive member 704 is disposed on the second surface of the insulating member 50 and the conductive member 702a is disposed on the first surface of the insulating member 50, the part of the second portion 704b of the conductive member 704 and the part of the conductive member 702a do not make contact with each other.

As illustrated in FIG. 4, the first power-source relay 5a and the second power-source relay 5b in the first control unit 1a and the second control unit 1b, respectively, that are configured as two systems are formed of the same components and are connected with the respective conductive members; the first filter 6a and the second filter 6b in the first control unit 1a and the second control unit 1b, respectively, are formed of the same components and are connected with the respective conductive members; the first power-source relay 5a and the second power-source relay 5b are symmetrically arranged with respect to a direction the same as the direction with respect to which the first filter 6a and the second filter 6b are symmetrically arranged. However, the respective widths, the respective lengths, and the like of the conductive members in the two systems are formed in such a way as to be the same as much as possible so that there occurs no difference between the respective inductances or the respective impedances of the two systems.

It may be allowed that instead of the insulating member 50, a wiring board on which wiring strip conductors are provided through printed wiring is utilized. In the case where the wiring board is utilized, the switching devices Qa1, Qa2, Qb1, and Qb2 in the first power-source relay 5a and the second power-source relay 5b and the filter capacitors Ca and Cb and the filter coils CLa and Clb in the first filter 6a and the second filter 6b are mounted on the wiring board and are connected with one another through the wiring strip conductors provided on the wiring board.

The power-source terminal 44a of the power-source connector 42 is connected with a first wiring strip conductor 801a and a second wiring strip conductor 801b each having a small width for a relatively small current in addition to the conductive member 701, as the foregoing bus bar, having a large width. Because these wiring strip conductors 801a and 801b are collectively connected with the power-source terminal 44a, the first wiring strip conductor 801a and the second wiring strip conductor 801b are provided in such a way as to branch from the power-source terminal 44a. The first wiring strip conductor 801a and the second wiring strip conductor 801b are provided on one surface of the insulating member 50, as is the case with the conductive members 701, 702a, 702b, 703a, 703b, 705a, and 705b, as the bus bars. Each of the first wiring strip conductor 801a and the second wiring strip conductor 801b may be replaced by an ordinary lead wire.

The first wiring strip conductor 801a that has branched from the power-source terminal 44a is connected with a first circuit unit 51a. In the first circuit unit 51a, the power-source relay driving circuit 35a, represented in FIG. 3, in the first control unit 1a, the first detection circuit 36a having the resistor R6 for detecting a current, and the like are mounted. The second wiring strip conductor 801b that has branched from the power-source terminal 44a is connected with a second circuit unit 51b. In the second circuit unit 51b, the power-source relay driving circuit (unillustrated) in the second control unit 1b, the first detection circuit (unillustrated) having the resistor R6 for detecting a current, and the like are mounted.

As illustrated in FIG. 4, in part of each of the first wiring strip conductor 801a and the second wiring strip conductor 801b, a narrow strip conductor portion that is fusible with an excessive current larger than a predetermined value is provided; thus, it is made possible that when a short-to-ground failure occurs in any one of the power-source relay driving circuits 35a, the respective detection circuits, and the like in the first control unit 1a and the second control unit 1b, an excessive current larger that a predetermined value is prevented from flowing.

The insulating member 50 has two or more first through-holes 52a formed in the vicinity of the first circuit unit 51a and two or more second through-holes 52b formed in the vicinity of the second circuit unit 51b. As illustrated in FIG. 2, the first through-hole 52a is connected with a lead wire 521a connected with the first CPU 10a mounted on the control board 4; the second through-hole 52b is connected with a lead wire 521b connected with the second CPU 10b mounted on the control board 4. As illustrated in FIG. 2, a signal line from the first signal connector 43a is connected with the first power module having the first inverter circuit 3a, through the intermediate frame 401. As illustrated in FIG. 2, a signal line from the second signal connector 43b is connected with the second power module having the second inverter circuit 3b, through the intermediate frame 401.

As described above, the power-source system line supplied from the power-source connector 42 provided on the top-surface portion of the housing 40 of the control unit 1 branches into the first portion 701a and the second portion 701b through the conductive member 701 as two thick bus bars, and then further branches into the narrow first wiring strip conductor 801a and the narrow second wiring strip conductor 801b. The system of the first portion 701a, of the conductive member 701 as a bus bar, that has branched is connected with the first power-source relay 5a, the first filter 6a, and the like in the first control unit 1a; the system of the second portion 701b of the conductive member 701 is connected with the second power-source relay 5b, the second filter 6b, and the like in the second control unit 1b.

The first power-source relay 5a and the second power-source relay 5b are arranged in the foregoing manner at the respective uppermost-stream positions of the +B power source connected with the power-source connector 42 of the electric power steering apparatus, so that the power supply can be cut off for a failure that occurs at the downstream side of each of these power-source relays. Moreover, the redundancy of the control unit can be secured by not arranging two power-source connectors but providing only a single power-source connector 42. Furthermore, because the first filter 6a and the second filter 6b can be arranged in such a way as to be close to the first inverter circuit 3a and the second inverter circuit 3b, respectively, which are noise generating portions, it is made possible to effectively release the noise generated by the inverter circuits. Moreover, the filter capacitors Ca and Cb, the filter coils CLa and CLb, and the like included in the first filter 6a and the second filter 6b are arranged in a concentrated manner in the first filter room 41a and the second filter room 41b, respectively, that are convex and protrude in the axle direction; therefore, it is made possible to downsize the apparatus.

Furthermore, while the first power-source relay 5a, the second power-source relay 5b, the first filter 6a, the second filter 6b, the first circuit unit 51a, and the second circuit unit 51b are each arranged in a concentrated manner on the top-surface portion of the housing 40, the control board 4, the first inverter circuit 3a, and the second inverter circuit 3b are arranged in the housing 40; therefore, without being affected by the control board 4, the first inverter circuit 3a, and the second inverter circuit 3b, each of the first power-source relay 5a, the second power-source relay 5b, the first filter 6a, the second filter 6b, the first circuit unit 51a, and the second circuit unit 51b can independently be designed, and hence the foregoing configuration contributes to downsizing of the apparatus. With regard to the first power-source relay 5a, the second power-source relay 5b, the first filter 6a, the second filter 6b, the first circuit unit 51a, and the second circuit unit 51b arranged on the top-surface portion of the housing 40 and the control board 4, the first inverter circuit 3a, and the second inverter circuit 3b and the like arranged in the housing 40, arrangement of the respective terminals thereof is taken into consideration so that connections thereof are facilitated.

Embodiment 2

Next, an electric power steering apparatus according to Embodiment 2 of the present invention will be explained.

Figure 5:
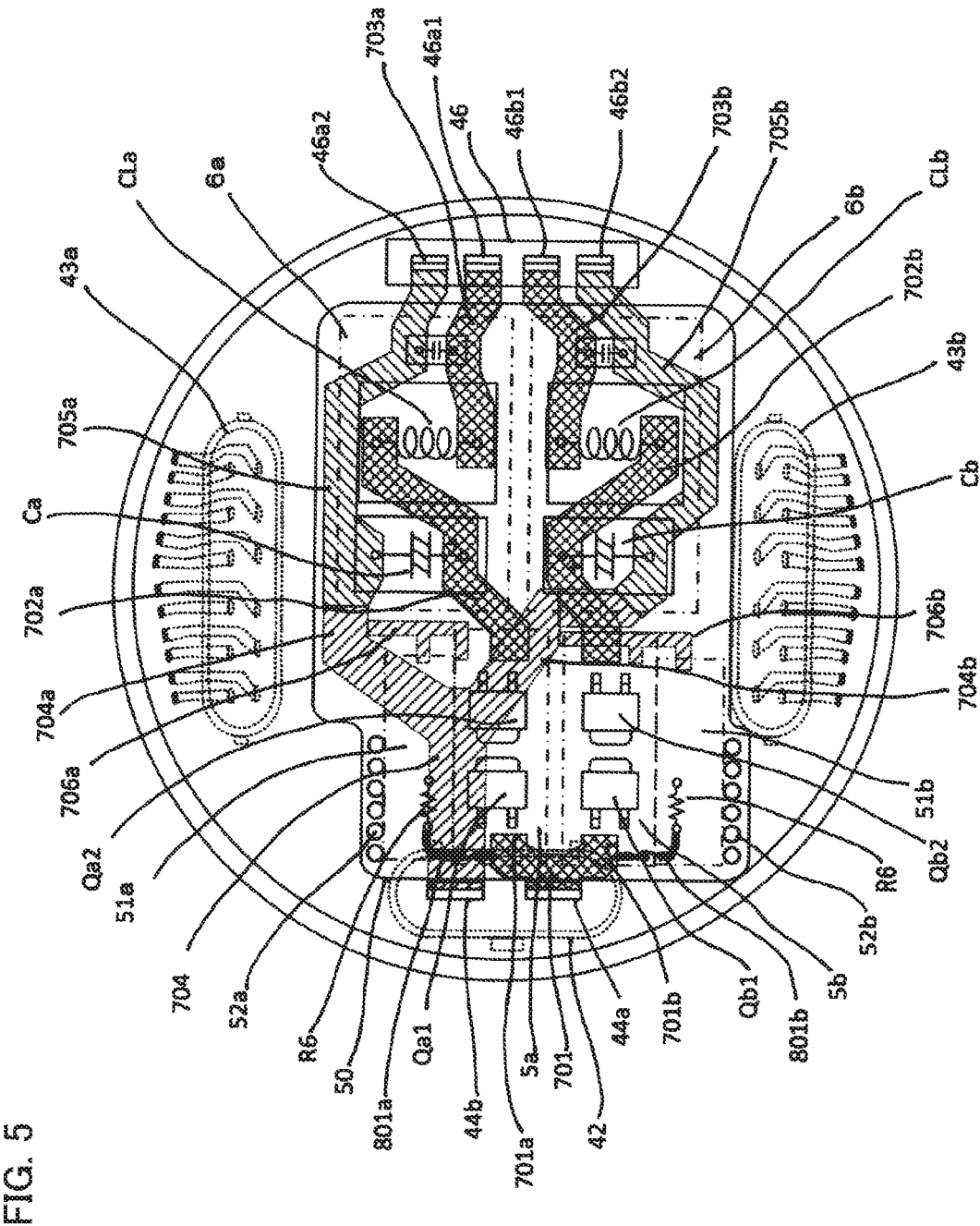
FIG. 5 is a plan view representing the detailed configuration of part of an electric power steering apparatus according to Embodiment 2 of the present invention.

FIG. 5 is a plan view representing the detailed configuration of part of the electric power steering apparatus according to Embodiment 2 of the present invention. FIG. 5 is a plan view corresponding to FIG. 4 in foregoing Embodiment 1. The constituent elements with the reference characters the same as those in FIG. 4 denote the same or equivalent constituent elements. FIGS. 1 through 3 will be applied also to Embodiment 2 of the present invention.

In FIG. 5, the respective components are arranged substantially in a linearly symmetrical manner. The respective disposal directions of the power-source relaying switching devices Qa1 and Qa2 of the first power-source relay 5a, the power-source relaying switching devices Qb1 and Qb2 of the second power-source relay 5b, and the filter capacitor Cb of the second filter 6b are different from those in Embodiment 1; the arrangement order of the first positive-polarity terminal 46a1, the first negative-polarity terminal 46a2, the second positive-polarity terminal 46b1, and the second negative-polarity terminal 46b2 in the terminal unit 46 is also different from that in Embodiment 1. Furthermore, part of the respective shapes and disposals of the conductive members are different from those in Embodiment. Moreover, in Embodiment 2, the conductive member connected with the power-source terminal 44b of the power-source connector 42 branches into two portions; after the branching, each of the two portions further branches into two ground lines each having a small width.

Hereinafter, the electric power steering apparatus according to Embodiment 2 will be explained in detail. In FIG. 5, an insulating member 50 formed of resin is embedded or mounted in the inner surface portion of the housing 40, as illustrated in FIG. 2; the insulating member 50 has a first surface, which is an anti-motor-side surface, and a second surface, which is a motor-side surface. The first surface and the second surface of the insulating member 50 are in a front-and-back relationship. A power-source terminal 44a in the power-source connector 42 is provided on the first surface of the insulating member 50 and is connected with the +B power source connected with the positive-polarity terminal of the battery 9. A power-source terminal 44b in the power-source connector 42 is provided on the second surface of the insulating member 50 and is connected with the ground terminal GND.

The first power-source relay 5a and the second power-source relay 5b are arranged in parallel with each other in the vertical direction of FIG. 5 and are fixed on the first surface of the insulating member 50. A pair of power-source relaying switching devices Qa1 and Qa2 in the first power-source relay 5a are arranged in parallel with each other in the horizontal direction of FIG. 5 and are arranged in such a way as to be oriented opposite to each other in the horizontal direction. A pair of power-source relaying switching devices Qb1 and Qb2 in the second power-source relay 5b are arranged in parallel with each other in the horizontal direction of FIG. 5 and are arranged in such a way as to be oriented opposite to each other in the horizontal direction. The first power-source relay 5a and the second power-source relay 5ba are configured in the same manner.

The first filter 6a and the second filter 6b are arranged at a terminal unit 46 side with respect to the first power-source relay 5a and the second power-source relay 5b. The first filter 6a and the second filter 6b are arranged in parallel with each other in the vertical direction of FIG. 5 and are fixed on the first surface of the insulating member 50. The filter capacitor Ca and the filter coil CLa of the first filter 6a are arranged in the horizontal direction of FIG. 5; similarly, the filter capacitor Cb and the filter coil CLb of the second filter 6b are arranged in the horizontal direction of FIG. 5. While the filter capacitor Ca of the first filter 6a is disposed in such a way that the positive-polarity terminal thereof is oriented toward the lower side of FIG. 5, the filter capacitor Cb of the second filter 6b is disposed in such a way that the positive-polarity terminal thereof is oriented toward the upper side of FIG. 5.

A conductive member 701, as a bus bar, connected with the power-source terminal 44a is disposed on the first surface of the insulating member 50 and branches into a first portion 701a and a second portion 701b in the vicinity of the power-source terminal 44a. The first portion 701a that has branched is connected with the power-source relaying switching devices Qa1 and Qa2 of the first power-source relay 5a in the first control unit 1a. The second portion 701b that has branched is connected with the power-source relaying switching devices Qb1 and Qb2 of the second power-source relay 5b in the second portion 701b.

A conductive member 702a, as a bus bar, disposed on the first surface of the insulating member 50 is connected with the power-source relaying switching devices Qa1 and Qa2 of the first power-source relay 5a and is connected with the positive-polarity terminal of the filter capacitor Ca of the first filter 6a and with one end of the filter coil CLa. A conductive member 702b, as a bus bar, disposed on the first surface of the insulating member 50 is connected with the power-source relaying switching devices Qb1 and Qb2 of the second power-source relay 5b and is connected with the positive-polarity terminal of the filter capacitor Cb of the second filter 6b and with one end of the filter coil CLb.

The conductive member 702b bends upward as illustrated in FIG. 5 and is connected with the positive-polarity terminal of the filter capacitor Cb of the second filter 6b; the shape of the conductive member 702b is a reverse of the shape of the conductive member 702b, in Embodiment 1, that bends downward. The reason for this is that the respective positions of the positive-polarity terminal of the filter capacitor Cb in Embodiment 1 and the positive-polarity terminal of the filter capacitor Cb in Embodiment 2 are opposite to each other.

The terminal unit 46 has a first positive-polarity terminal 46a1, a second positive-polarity terminal 46b1, a first negative-polarity terminal 46a2, and a second negative-polarity terminal 46b2; these terminals are provided on the first surface of the insulating member 50; from the upper position to the lower position of FIG. 5, the first negative-polarity terminal 46a2, the first positive-polarity terminal 46a1, the second positive-polarity terminal 46b1, and the second negative-polarity terminal 46b2 are sequentially arranged in that order. In Embodiment 2, the second positive-polarity terminal 46b1 and the second negative-polarity terminal 46b2 are arranged in reverse order. As illustrated in FIG. 2, these terminals each extend to the first power module including the first inverter circuit 3a and the second power module including the second inverter circuit 3b, through the control board 4; the first power module and the second power module are mounted in the intermediate frame 401.

The first positive-polarity terminal 46a1 is connected with the positive-polarity DC terminal of the first inverter circuit 3a; the first negative-polarity terminal 46a2 is connected with the negative-polarity DC terminal of the first inverter circuit 3a; the second positive-polarity terminal 46b1 is connected with the positive-polarity DC terminal of the second inverter circuit 3b; the second negative-polarity terminal 46b2 is connected with the negative-polarity DC terminal of the second inverter circuit 3b.

In FIG. 5, a conductive member 703a, as a bus bar, disposed on the first surface of the insulating member 50 is connected with the other end of the filter coil CLa in the first filter 6a and with the positive-polarity terminal 46a1 of the terminal unit 46. A conductive member 703b, as a bus bar, disposed on the first surface of the insulating member 50 is connected with the other end of the filter coil CLb in the second filter 6b and with the positive-polarity terminal 46b1 of the terminal unit 46. The respective shapes of the conductive member 703a and the conductive member 703b that are arranged to be adjacent to each other are substantially linear-symmetric with each other.

A conductive member 704 connected with the power-source terminal 44b in the power-source connector 42 is disposed on the second surface of the insulating member 50 and branches into a first portion 704a and a second portion 704b. A conductive member 705a disposed on the first surface of the insulating member 50 is electrically connected with the first portion 704a of the conductive member 704 disposed on the second surface of the insulating member 50 and is connected with the negative-polarity terminal of the filter capacitor Ca in the first filter 6a and with the first negative-polarity terminal 46a2 of the terminal unit 46. A conductive member 705b disposed on the first surface of the insulating member 50 is electrically connected with the second portion 704b of the conductive member 704 disposed on the second surface of the insulating member 50 and is connected with the negative-polarity terminal of the filter capacitor Cb in the second filter 6b and with the second negative-polarity terminal 46a2 of the terminal unit 46. In Embodiment 1, the conductive member 705b is disposed at the substantially middle portion of the insulating member 50; however, in Embodiment 2, the conductive member 705b is disposed at the peripheral portion of the insulating member 50.

Part of the second portion 704b of the conductive member 704 and part of the conductive member 702a overlap with each other in the vertical direction with respect to the paper plane of FIG. 5; however, because as described above, the conductive member 704 is disposed on the second surface of the insulating member 50 and the conductive member 702a is disposed on the first surface of the insulating member 50, the part of the second portion 704b of the conductive member 704 and the part of the conductive member 702a do not make contact with each other.

A first ground line 706a having a small width branches further from the first portion 704a, of the conductive member 704, that has branched. A second ground line 706b having a small width branches further from the second portion 704b, of the conductive member 704, that has branched. The first ground line 706a and the second ground line 706b are arranged on the second surface of the insulating member 50.

The first ground line 706a is an electric conductor corresponding to a small-current circuit, extends to a circuit board on which an after-mentioned first circuit unit 51a is mounted and a circuit board on which the switching devices Qa1 and Qa2 of the first power-source relay 5a are mounted, and is connected with these components. The second ground line 706b is an electric conductor corresponding to a small-current circuit, extends to a circuit board on which an after-mentioned second circuit unit 51b is mounted and a circuit board on which the switching devices Qb1 and Qb2 of the second power-source relay 5b are mounted, and is connected with these components.

As illustrated in FIG. 5, the first power-source relay 5a and the second power-source relay 5b in the first control unit 1a and the second control unit 1b, respectively, that are configured as two systems are formed of the same components and are connected with the respective conductive members; the first filter 6a and the second filter 6b in the first control unit 1a and the second control unit 1b, respectively, are formed of the same components and are connected with the respective conductive members; the first power-source relay 5a and the second power-source relay 5b are symmetrically arranged with respect to a direction the same as the direction with respect to which the first filter 6a and the second filter 6b are symmetrically arranged. However, the respective widths, the respective lengths, and the like of the conductive members in the two systems are formed in such a way as to be the same as much as possible so that there occurs no difference between the respective inductances or the respective impedances of the two systems.

It may be allowed that instead of the insulating member 50, a wiring board on which wiring strip conductors are provided through printed wiring is utilized. In the case where the wiring board is utilized, the switching devices Qa1, Qa2, Qb1, and Qb2 in the first power-source relay 5a and the second power-source relay 5b and the filter capacitors Ca and Cb and the filter coils CLa and Clb in the first filter 6a and the second filter 6b are mounted on the wiring board and are connected with one another through the wiring strip conductors provided on the wiring board.

The power-source terminal 44a of the power-source connector 42 is connected with a first wiring strip conductor 801a and a second wiring strip conductor 801b each having a small width for a relatively small current in addition to the conductive member 701, as a bus bar, having a large width. Because these wiring strip conductors 801a and 801b are collectively connected with the power-source terminal 44a, the first wiring strip conductor 801a and the second wiring strip conductor 801b are provided in such a way as to branch from the power-source terminal 44a. The first wiring strip conductor 801a and the second wiring strip conductor 801b are provided on one surface of the insulating member 50, as is the case with the conductive members 701, 702a, 702b, 703a, 703b, 705a, and 705b, as the bus bars. Each of the first wiring strip conductor 801a and the second wiring strip conductor 801b may be replaced by an ordinary lead wire.

The first wiring strip conductor 801a that has branched from the power-source terminal 44a is connected with a first circuit unit 51a. In the first circuit unit 51a, the power-source relay driving circuit 35a, represented in FIG. 3, in the first control unit 1a, the first detection circuit 36a having the resistor R6 for detecting a current, and the like are mounted. The second wiring strip conductor 801b that has branched from the power-source terminal 44a is connected with a second circuit unit 51b. In the second circuit unit 51b, the power-source relay driving circuit (unillustrated) in the second control unit 1b, the first detection circuit (unillustrated) having the resistor R6 for detecting a current, and the like are mounted.

As illustrated in FIG. 4, in part of each of the first wiring strip conductor 801a and the second wiring strip conductor 801b, a narrow strip conductor that is fusible with an excessive current larger than a predetermined value is provided; thus, it is made possible that when a short-to-ground failure occurs in any one of the power-source relay driving circuits 35a, the respective detection circuits, and the like in the first control unit 1a and the second control unit 1b, an excessive current larger that a predetermined value is prevented from flowing.

The insulating member 50 has two or more first through-holes 52a formed in the vicinity of the first circuit unit 51a and two or more second through-holes 52b formed in the vicinity of the second circuit unit 51b. As illustrated in FIG. 2, the first through-hole 52a is connected with a lead wire 521a connected with the first CPU 10a mounted on the control board 4; the second through-hole 52b is connected with a lead wire 521b connected with the second CPU 10b mounted on the control board 4. As illustrated in FIG. 2, a signal line from the first signal connector 43a is connected with the first power module having the first inverter circuit 3a, through the intermediate frame 401. As illustrated in FIG. 2, a signal line from the second signal connector 43b is connected with the second power module having the second inverter circuit 3b, through the intermediate frame 401.

Because a large current flows in each of the power-source relaying switching devices Qa1 and Qa2 of the first power-source relay 5a and the power-source relaying switching devices Qb1 and Qb2 of the second power-source relay 5b, heat to be generated therein is large; therefore, it is required to take the heat radiation performance into consideration. These switching devices are arranged in the vicinity of the top surface of the housing 40 and exist at positions close to the outside of the electric power steering apparatus. Accordingly, a heat sink abuts on the power-source relaying switching devices Qa1, Qa2, Qb1, and Qb2, and part of the heat sink is exposed to the outside of the housing 40.

Figure 6:
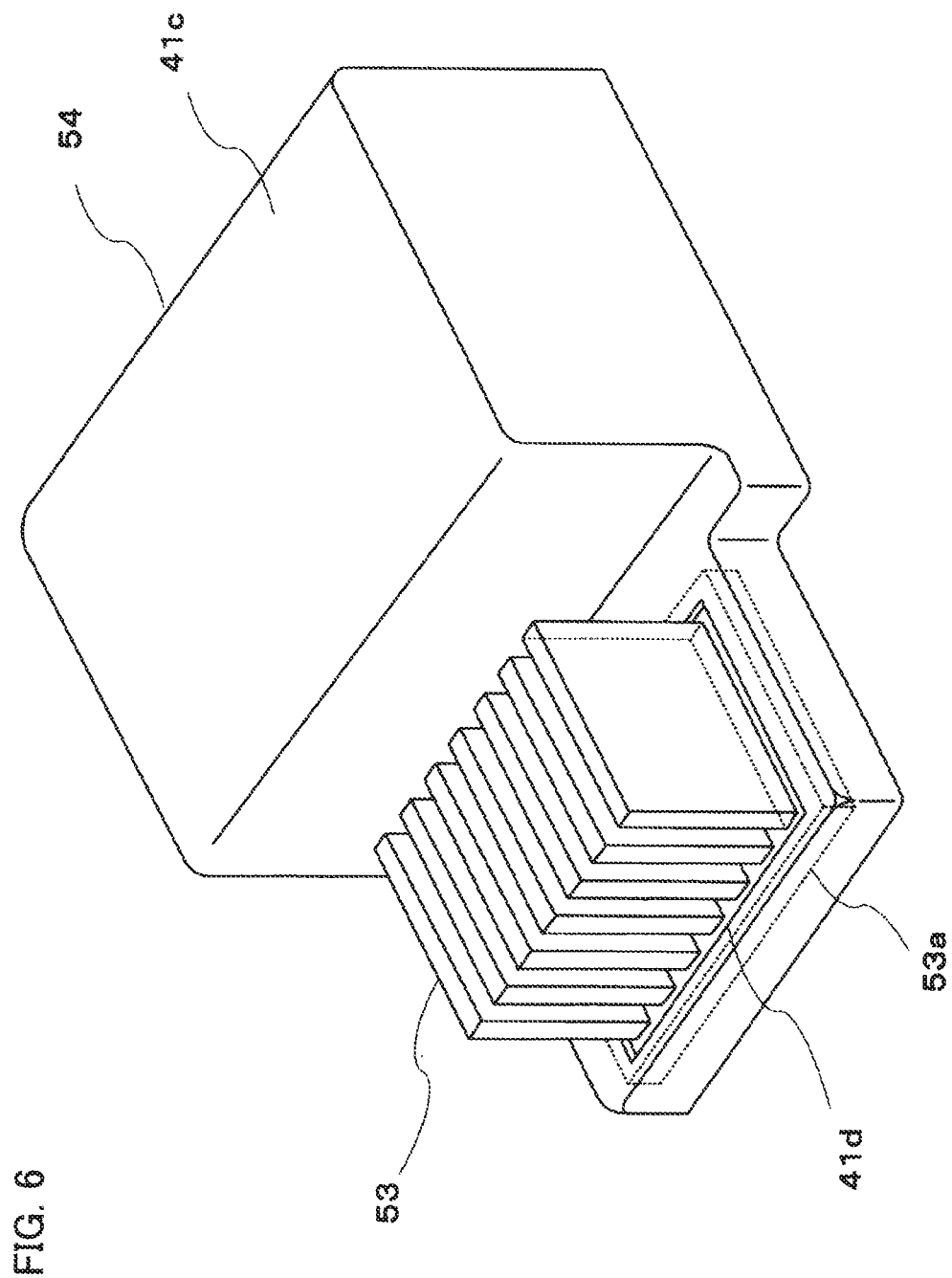
FIG. 6 is a perspective view illustrating a heat sink and a cover in the electric power steering apparatus according to Embodiment 2 of the present invention.

FIG. 6 is a perspective view illustrating a heat sink and a cover in the electric power steering apparatus according to Embodiment 2 of the present invention. In FIG. 6, a resin cover 54 is provided with an opening portion 41d for inserting a heat sink 53 thereinto, and the heat sink 53 having partition-like portions is exposed from the opening portion 41d. The bottom side 53a of the heat sink 53 abuts on the power-source relaying switching devices Qa1, Qa2, Qb1, and Qb2 so that heat radiation performances of these power-source relaying switching devices are secured.

A filter room 41c, which is part of the cover 54, collectively incorporates two sets of the filter capacitors Ca and Cb and two sets of the filter coils CLa and CLb. Instead of the first filter room 41a and the second filter room 41b illustrated in FIG. 2, the cover 54 is provided on the housing 40 and is disposed in such a way as to cover the power-source relaying switching devices Qa1, Qa2, Qb1, and Qb2 of the two sets of the power source relays 5a and 5b, the two sets of the filter capacitors Ca and Cb, the two sets of the filter coils CLa and CLb, and the like.

As described above, the power-source system line supplied from the power-source connector 42 provided on the top-surface portion of the housing 40 of the control unit 1 branches into the first portion 701a and the second portion 701b through the conductive member 701 as two thick bus bars, and then further branches into the narrow first wiring strip conductor 801a and the narrow second wiring strip conductor 801b. The system of the first portion 701a, of the conductive member 701 as a bus bar, that has branched is connected with the first power-source relay 5a, the first filter 6a, and the like in the first control unit 1a; the system of the second portion 701b of the conductive member 701 is connected with the second power-source relay 5b, the second filter 6b, and the like in the second control unit 1b.

The first power-source relay 5a and the second power-source relay 5b are arranged in the foregoing manner at the respective uppermost-stream positions of the +B power source connected with the power-source connector 42 of the electric power steering apparatus, so that the power supply can be cut off for a failure that occurs at the downstream side of each of these power-source relays. Moreover, the redundancy of the control unit can be secured by not arranging two power-source connectors but providing only a single power-source connector 42. Furthermore, because the first filter 6a and the second filter 6b can be arranged in such a way as to be close to the first inverter circuit 3a and the second inverter circuit 3b, respectively, which are noise generating portions, it is made possible to effectively release the noise generated by the inverter circuits. Moreover, the filter capacitors Ca and Cb, the filter coils CLa and CLb, and the like included in the first filter 6a and the second filter 6b are arranged in a concentrated manner in the first filter room 41a and the second filter room 41b, respectively, that are convex and protrude in the axle direction; therefore, it is made possible to downsize the apparatus.

Furthermore, while the first power-source relay 5a, the second power-source relay 5b, the first filter 6a, the second filter 6b, the first circuit unit 51a, and the second circuit unit 51b are each arrange in a concentrated manner on the top-surface portion of the housing 40, the control board 4, the first inverter circuit 3a, and the second inverter circuit 3b are arrange in the housing 40; therefore, without being affected by the control board 4, the first inverter circuit 3a, and the second inverter circuit 3b, each of the first power-source relay 5a, the second power-source relay 5b, the first filter 6a, the second filter 6b, the first circuit unit 51a, and the second circuit unit 51b can independently be designed, and hence the foregoing configuration contributes to downsizing of the apparatus. With regard to the first power-source relay 5a, the second power-source relay 5b, the first filter 6a, the second filter 6b, the first circuit unit 51a, and the second circuit unit 51b arrange on the top-surface portion of the housing 40 and the control board 4, the first inverter circuit 3a, and the second inverter circuit 3b and the like arrange in the housing 40, arrangement of the respective terminals thereof is taken into consideration so that connections thereof are facilitated.

As described above, in the electric power steering apparatus according to Embodiment 2 of the present invention, the heat radiation performance of the power source relay is secured, and the ground line branches into four portions; thus, as is the case with the +B power source line, the ground lines can be arranged in the respective sets of circuits. Accordingly, because the respective sets of circuits and power-source system lines are independently arranged and connected, it is made possible to reduce the probability that an abnormality in one of the sets affects the other one of the sets.

The present invention is not limited to the electric power steering apparatus according to any one of foregoing Embodiments 1 and 2; in the scope within the spirits of the present invention, the configurations of Embodiments 1 and 2 can appropriately be combined with each other, can partially be modified, or can partially be omitted.

INDUSTRIAL APPLICABILITY

The present invention can be applied not only to an electric power steering apparatus to be mounted in a vehicle such as an automobile but also to the automobile industry.

DESCRIPTION OF REFERENCE NUMERALS

1: control unit
1a: 1st control unit
1b: 2nd control unit
2: electric motor
24: armature winding
2a: 1st armature winding
2b: 2nd armature winding
10a: 1st CPU
10b: 2nd CPU
3a: 1st inverter circuit
3b: 2nd inverter circuit
4: control board
4a: 1st control circuit unit
4b: 2nd control circuit unit
5a: 1st power-source relay
5b: 2nd power-source relay
6a: 1st filter
6b: 2nd filter
7: ignition switch
8: sensors
9: battery
12a: 1st input circuit
12b: 2nd input circuit
11a: 1st driving circuit
11b: 2nd driving circuit
17a: 1st rotation sensor
17b: 2nd rotation sensor
15: notification means
16a: 1st output circuit
16: 2nd output circuit
21: electric-motor output axle
25: electric motor case
26a: 1st winding end portion
26b: 2nd winding end portion
27: connection ring
28: frame
40: housing
41a: 1st filter room
41b: 2nd filter room
42: power-source connector
43a: 1st signal connector
43b: 2nd signal connector
35a: power-source relay driving circuit
36a: 1st detection circuit
13a: 2nd detection circuit
18u: 3rd detection circuit
19u: 4th detection circuit
44a, 44b: power-source terminal
46: terminal unit
46a1, 46b1: positive-polarity terminal
46a2, 46b2: negative-polarity terminal
701, 702a, 702b: conductive member
50: insulating material
51a: 1st circuit unit
51b: 2nd circuit unit
52a: 1st through-hole
52b: 2nd through-hole
401: intermediate frame
521a, 521b: lead wire
706a: 1st ground line
706b: 2nd ground line
54: cover
53: heat sink

The invention claimed is:

1. An electric power steering apparatus comprising:
an electric motor that produces assist torque, based on steering torque produced by a driver of a vehicle;
a controller that controls the electric motor; and
a power-source connector that is connected with a battery mounted in the vehicle and supplies respective power sources to the controller and the electric motor, wherein the electric motor is provided with two armature windings sets including a first armature winding and a second armature winding that are formed in substantially the same manner, wherein the controller includes a first controller formed in such a way as to be capable of independently controlling the first armature winding and a second controller formed in such a way as to be capable of independently controlling the second armature winding, each of the first controller and the second controller comprising sets of elements that are formed in substantially the same manner, respectively, wherein each of the first controller and the second controller further comprises:
 a power source relay formed in such a way as to be capable of turning on/off a power source,
 a filter connected with the power source relay,
 an input circuit to which information from a sensor is input,
 a first driving circuit that generates a driving signal for driving the electric motor,
 an inverter circuit that is controlled by the driving signal, and
 a control circuit provided with a central processing unit (CPU) that outputs to the first driving circuit a command signal for controlling the electric motor based on the information input to the input circuit, wherein the power-source connector is formed of a single connector, wherein out of terminals of the power-source connector, a power source system to be connected at least with a positive-polarity side of the battery branches into two first branch lines in an immediate vicinity of the terminals, wherein the power source relay, the filter, and the inverter circuit in the first controller are sequentially connected with one of the two first branch lines in this order, with the power source relay situated at an upstream side of the power source system, wherein the power source relay, the filter, and the inverter circuit in the second controller are sequentially connected with the other one of the two first branch lines in this order, with the power source relay situated at the upstream side of the power source system, wherein the power source relay and the filter in the first controller and the power source relay and the filter in the second controller are provided with substantially the same configuration and are arranged substantially symmetrically with respect to the terminals of the power-source connector, wherein each of the two first branch lines further re-branches into two lines, wherein one of the re-branch lines that have re-branched from the one of the two first branch lines is connected with the power source relay, the filter, and the inverter circuit in the first controller, wherein other one of the re-branch lines that have re-branched from the one of the two first branch lines is connected at least with a first detection circuit that monitors the power source system in the first controller, wherein one of the re-branch lines that have re-branched from the other one of the two first branch lines is connected with the power source relay, the filter, and the inverter circuit in the second controller, wherein other one of the re-branch lines that have re-branched from the other one of the two first branch lines is connected at least with a first detection circuit that monitors the power source system in the second controller, wherein the two re-branch lines in the first controller and the two re-branch lines in the second controller are arranged substantially symmetrically with respect to the terminals of the power-source connector, and wherein the first detection circuit in the first controller and the first detection circuit in the second controller are each provided with substantially the same configuration.

2. The electric power steering apparatus according to claim 1, wherein the electric motor and the controller are arranged concentrically with each other,
 wherein the power-source connector is disposed at an axle-direction end portion of the controller,
 wherein the power source relay, the filter, and the first detection circuit are arranged at the axle-direction end portion of the controller in such a way as to be adjacent to the power-source connector, and
 wherein at least one from among the input circuit, the first driving circuit, the inverter circuit, and the control circuit is disposed in the controller in such a way as to be at a position that is closer to the electric motor than positions of the power source relay, the filter, and the first detection circuit.

3. The electric power steering apparatus according to claim 1, wherein the first detection circuit of the controller is provided with a function of detecting an excessive current in at least the power source system, determines that the CPU has an abnormality when a current the same as or larger than a predetermined value flows, and cuts off the power source system to which the CPU that has been determined to have the abnormality belongs.

4. The electric power steering apparatus according to claim 1, further including a second detection circuit that detects an excessive current, at the downstream side of the filter in the power source system, in the controller or a short-to-ground failure in the power source system, wherein when the second detection circuit detects the excessive current or the short-to-ground failure, the power source relay in the power source system in which the excessive current or the short-to-ground failure has been detected is cut off.

5. The electric power steering apparatus according to claim 1, wherein out of terminals of the power-source connector, a terminal to be connected with a negative-polarity side of the battery branches into two second branch lines in the immediate vicinity of the terminal,
 wherein each of the two second branch lines further re-branches into two lines, and
 wherein one of the two re-branch lines is formed of a ground line connected at least with a ground-level portion of the first detection circuit.

6. The electric power steering apparatus according to claim 2, wherein the first detection circuit of the controller is provided with a function of detecting an excessive current in at least the power source system, determines that the CPU has an abnormality when a current the same as or larger than a predetermined value flows, and cuts off the power source system to which the CPU that has been determined to have the abnormality belongs.

7. The electric power steering apparatus according to claim 2, further including a second detection circuit that detects an excessive current, at the downstream side of the filter in the power source system, in the controller or a short-to-ground failure in the power source system, wherein when the second detection circuit detects the excessive current or the short-to-ground failure, the power source relay in the power source system in which the excessive current or the short-to-ground failure has been detected is cut off.

8. The electric power steering apparatus according to claim 2, wherein the controller has a case that is adjacent to the power-source connector and incorporates the power source relay, the first detection circuit, and the filter for each of the first controller and the second controller.

9. The electric power steering apparatus according to claim 2, wherein out of terminals of the power-source connector, a terminal to be connected with a negative-polarity side of the battery branches into two second branch lines in the immediate vicinity of the terminal,
 wherein each of the two second branch lines further re-branches into two lines, and
 wherein one of the two re-branch lines is formed of a ground line connected at least with a ground-level portion of the first detection circuit.

10. The electric power steering apparatus according to claim 3, further including a second detection circuit that detects an excessive current, at the downstream side of the filter in the power source system, in the controller or a short-to-ground failure in the power source system, wherein when the second detection circuit detects the excessive current or the short-to-ground failure, the power source relay in the power source system in which the excessive current or the short-to-ground failure has been detected is cut off.

11. The electric power steering apparatus according to claim 3, wherein a second driving circuit that is connected to and drives the power source relay is provided in at vicinity of the first detection circuit of the controller, and
 wherein the first detection circuit monitors a current at least in the second driving circuit and a current flowing at the downstream side of the power source relay.

12. The electric power steering apparatus according to claim 3, wherein the controller has a case that is adjacent to the power-source connector and incorporates the power source relay, the first detection circuit, and the filter for each of the first controller and the second controller.

13. The electric power steering apparatus according to claim 4, wherein a second driving circuit that is connected to and drives the power source relay is provided in a vicinity of the first detection circuit of the controller, and
 wherein the first detection circuit monitors a current at least in the second driving circuit and a current flowing at the downstream side of the power source relay.

14. The electric power steering apparatus according to claim 4, wherein the controller has a case that is adjacent to the power-source connector and incorporates the power source relay, the first detection circuit, and the filter for each of the first controller and the second controller.

15. The electric power steering apparatus according to claim 6, further including a second detection circuit that detects an excessive current, at the downstream side of the filter in the power source system, in the controller or a short-to-ground failure in the power source system, wherein when the second detection circuit detects the excessive current or the short-to-ground failure, the power source relay in the power source system in which the excessive current or the short-to-ground failure has been detected is cut off.

16. The electric power steering apparatus according to claim 6, wherein a second driving circuit that is connected to and drives the power source relay is provided in a vicinity of the first detection circuit of the controller, and
 wherein the first detection circuit monitors a current at least in the second driving circuit and a current flowing at the downstream side of the power source relay.

17. The electric power steering apparatus according to claim 7, wherein a second driving circuit that is connected to and drives the power source relay is provided in a vicinity of the first detection circuit of the controller, and
 wherein the first detection circuit monitors a current at least in the second driving circuit and a current flowing at the downstream side of the power source relay.

18. The electric power steering apparatus according to claim 10, wherein a second driving circuit that is connected to and drives the power source relay is provided in a vicinity of the first detection circuit of the controller, and
 wherein the first detection circuit monitors a current at least in the second driving circuit and a current flowing at the downstream side, in the power source system of the power source relay.

19. The electric power steering apparatus according to claim 15, wherein a second driving circuit that is connected to and drives the power source relay is provided in a vicinity of the first detection circuit of the controller, and
 wherein the first detection circuit monitors a current at least in the second driving circuit and a current flowing at the downstream side of the power source relay.

* * * * *